(12) United States Patent
Traser et al.

(10) Patent No.: US 9,914,854 B2
(45) Date of Patent: *Mar. 13, 2018

(54) MULTILAYER FILM HAVING AT LEAST ONE THIN LAYER AND CONTINUOUS PROCESS FOR FORMING SUCH A FILM

(75) Inventors: Steffen Traser, Darmstadt (DE); Jan D. Forster, Aachen (DE); Bernd Kuehneweg, Dusseldorf (DE)

(73) Assignee: 3M INNOVATIVE PROPERTIES COMPANY, St. Paul, MN (US)

( * ) Notice: Subject to any disclaimer, the term of this patent is extended or adjusted under 35 U.S.C. 154(b) by 57 days.

This patent is subject to a terminal disclaimer.

(21) Appl. No.: 14/234,272

(22) PCT Filed: Jul. 25, 2012

(86) PCT No.: PCT/US2012/048082
§ 371 (c)(1),
(2), (4) Date: Jan. 22, 2014

(87) PCT Pub. No.: WO2013/019495
PCT Pub. Date: Feb. 7, 2013

(65) Prior Publication Data
US 2014/0154485 A1    Jun. 5, 2014

(30) Foreign Application Priority Data
Jul. 29, 2011   (EP) .................................. 11176045

(51) Int. Cl.
*B05D 1/26*  (2006.01)
*C09J 7/02*  (2006.01)
(Continued)

(52) U.S. Cl.
CPC .............. *C09J 7/0207* (2013.01); *B05D 1/42* (2013.01); *B05D 7/5423* (2013.01); *B05D 7/56* (2013.01);
(Continued)

(58) Field of Classification Search
CPC ..... B05C 11/04; B05C 5/0245; B05C 5/0254; B05D 1/26; B05D 7/52–7/58; B05D 7/5423
See application file for complete search history.

(56) References Cited

U.S. PATENT DOCUMENTS 2,761,419 A * 9/1956 Mercier .................. B05C 5/007
118/412
4,143,190 A    3/1979 Choinski
(Continued)

FOREIGN PATENT DOCUMENTS

EP    0421162    4/1991
EP    0974632    1/2000
(Continued)

OTHER PUBLICATIONS

Crowley, "A Three-Dimensional Approach to Solubility", Journal of Paint Technology, May 1966, vol. 38, No. 496, pp. 269-280.
(Continued)

*Primary Examiner* — Scott W Dodds
(74) *Attorney, Agent, or Firm* — Yufeng Dong; Jean A. Lown

(57) ABSTRACT

The invention relates to a continuous self-metered process of forming a multilayer film comprising at least two superimposed polymer layers comprising the steps of: (i) providing a substrate (5); (ii) providing two or more coating knives (2, 3, 4) which are offset, independently from each other, from said substrate (5) and/or from an adjacent coating knife to form at least one substrate gap (9) relative to the surface of the substrate (5) and at least one outlet gap (10) relative to the surface of an adjacent coating knife; (iii) moving the substrate (5) relative to the coating knives (2, 3, 4) in a downstream direction (6), (iv) providing curable liquid precursors of the polymers (I, II, III) to the upstream side of the coating knives (2, 3, 4) thereby coating the two or more
(Continued)

precursors (I, II, III) through the respective gaps (9, 10) as superimposed layers (12, 13, 14) onto the substrate (5); (v) optionally providing one or more solid films (1 1) and applying these essentially simultaneously with the formation of the adjacent lower polymer layer, and (vi) curing the precursor of the multilayer film thus obtained; wherein a lower layer of a curable liquid precursor (I, II, III) is covered by an adjacent upper layer of a curable liquid precursor (I, II, III) or a film (1 1), respectively, essentially without exposing said lower layer of a curable liquid precursor (I, II, III).

20 Claims, 4 Drawing Sheets

(51) Int. Cl.
| | |
|---|---|
| B05D 1/42 | (2006.01) |
| B32B 7/12 | (2006.01) |
| B05C 5/02 | (2006.01) |
| B05D 3/06 | (2006.01) |
| B05D 7/00 | (2006.01) |
| B05D 1/36 | (2006.01) |
| B05D 3/02 | (2006.01) |

(52) U.S. Cl.
CPC .............. *B32B 7/12* (2013.01); *B05C 5/0245* (2013.01); *B05D 1/26* (2013.01); *B05D 1/36* (2013.01); *B05D 3/0254* (2013.01); *B05D 3/067* (2013.01); *B05D 7/52* (2013.01); *B05D 7/5823* (2013.01); *B05D 2252/02* (2013.01); *Y10T 428/24959* (2015.01); *Y10T 428/269* (2015.01); *Y10T 428/31504* (2015.04)

(56) References Cited

U.S. PATENT DOCUMENTS

| | | | |
|---|---|---|---|
| 4,525,392 A | 6/1985 | Ishizaki | |
| 4,647,475 A | 3/1987 | Inukai | |
| 4,818,610 A | 4/1989 | Zimmerman | |
| 4,894,259 A | 1/1990 | Kuller | |
| 5,175,028 A | 12/1992 | Tanaka | |
| 5,340,613 A | 8/1994 | Hanzalik | |
| 5,525,376 A | 6/1996 | Leonard | |
| 5,601,647 A | 2/1997 | Pertzsch | |
| 5,612,092 A | 3/1997 | Strenger | |
| 5,728,430 A | 3/1998 | Sartor | |
| 5,858,097 A | 1/1999 | Richter | |
| 5,859,081 A | 1/1999 | Duffy | |
| 5,962,075 A | 10/1999 | Sartor | |
| 6,013,327 A | 1/2000 | Naruse | |
| 6,033,723 A | 3/2000 | Kistler | |
| 6,139,613 A | 10/2000 | Hendrickson | |
| 6,511,742 B1 | 1/2003 | Müssig | |
| 6,548,117 B2 | 4/2003 | Tomaru | |
| 6,777,053 B1 | 8/2004 | Günter | |
| 7,498,078 B2 | 3/2009 | Husemann | |
| 7,562,827 B2 | 7/2009 | Bargmann | |
| 7,862,861 B2 | 1/2011 | Kito | |
| 7,904,581 B2 | 3/2011 | Sherer | |
| 8,388,331 B2 | 3/2013 | Osada | |
| 2001/0052385 A1 | 12/2001 | Enlow | |
| 2002/0066404 A1 | 6/2002 | Ueberschar | |
| 2003/0056891 A1 | 3/2003 | Schroder | |
| 2003/0187170 A1 | 10/2003 | Burmeister | |
| 2004/0022954 A1 | 2/2004 | Tsuda | |
| 2004/0253464 A1 | 12/2004 | Krawinkel | |
| 2005/0247264 A1* | 11/2005 | Kawabe | B05D 1/26 118/407 |
| 2006/0269673 A1* | 11/2006 | Yapel | B05C 5/0262 427/256 |
| 2007/0137775 A1 | 6/2007 | Bargmann | |
| 2008/0199636 A1 | 8/2008 | Husemann | |
| 2008/0202662 A1 | 8/2008 | Husemann | |
| 2008/0206492 A1 | 8/2008 | Husemann | |
| 2008/0241503 A1* | 10/2008 | Romdhane | B01D 67/0013 428/315.9 |
| 2008/0286569 A1 | 11/2008 | Husemann | |
| 2013/0004694 A1 | 1/2013 | Hitschmann | |
| 2014/0154492 A1* | 6/2014 | Traser | C09J 7/00 428/220 |
| 2014/0255679 A1* | 9/2014 | Goeb | C09J 7/00 428/305.5 |

FOREIGN PATENT DOCUMENTS

| | | |
|---|---|---|
| EP | 1167019 | 1/2002 |
| EP | 1403190 | 3/2004 |
| EP | 1538262 | 6/2005 |
| EP | 1666554 | 6/2006 |
| EP | 1757429 | 2/2007 |
| EP | 2353736 | 8/2011 |
| JP | 02-307562 A | 12/1990 |
| JP | 07-124510 | 5/1995 |
| JP | 11-065022 | 3/1999 |
| JP | 2000-262962 | 9/2000 |
| JP | 2001-187362 | 7/2001 |
| JP | 2003-001648 | 1/2003 |
| JP | 2003-260400 A | 9/2003 |
| JP | 2005-254087 | 9/2005 |
| JP | 2006-051469 | 2/2006 |
| WO | WO 1996/08319 | 3/1996 |
| WO | WO 1998/56581 | 12/1998 |
| WO | WO 1999/28128 | 6/1999 |
| WO | WO 2001/054828 | 8/2001 |
| WO | WO 2001/89673 | 11/2001 |
| WO | WO 2004/000961 | 12/2003 |
| WO | WO 2005/038528 | 4/2005 |
| WO | WO 2008/042883 | 4/2008 |
| WO | WO 2008/141004 | 11/2008 |
| WO | WO 2010/073949 A1 | 7/2010 |
| WO | WO 2013/022941 | 2/2013 |

OTHER PUBLICATIONS

Kistler, "Liquid Film Coating: Scientific principles and their technological implications", First Edition, Chapman & Hall, pp. 9-10 (1997).

Kistler, "Liquid Film Coating: Scientific principles and their technological implications", First Edition, Chapman & Hall, London, England, Chapter 12, "Self-Metered Coating Processes", pp. 537-672, (1997).

Kistler, "Liquid Film Coating: Scientific principles and their technological implications", First Edition, Chapman & Hall, London, England, Chapter 13, "Free-Meniscus Coating Processes", pp. 673-708, (1997).

Kroschwitz, (Eds.); Kirk-Othmer Encyclopedia of Chemical Technology, 4th Edition; John Wiley & Sons, New York; vol. 6, Chlorocarbons and Chlorohydrocarbons—$C_2$ to Combustion Technology, pp. 610-615 (1993).

Sward, Chapter 2.7, 'Solvents', by W. H. Ellis, "Paint Testing Manual: Physical and Chemical Examination of Paints, Varnishes, Lacquers, and Colors", 13th edition, American Society for Testing and Materials, Philadelphia, Pennsylvania, (1972), pp. 130-149.

European Search Report for EP11176045, 8 pages.

International Search Report for PCT/US2012/048082, 4 pages.

* cited by examiner

MULTILAYER FILM HAVING AT LEAST ONE THIN LAYER AND CONTINUOUS PROCESS FOR FORMING SUCH A FILM

CROSS REFERENCE TO RELATED APPLICATIONS

This application is a national stage filing under 35 U.S.C. 371 of PCT/US2012/048082, filed Jul. 25, 2012, which claims priority to EP Application No. 11176045.0, filed Jul. 29, 2011, the disclosures of which are incorporated by reference in their entireties herein.

TECHNICAL FIELD

A multilayer film and a continuous process of forming the multilayer film is provided.

SUMMARY

The present invention relates to a continuous process of forming a multilayer film comprising at least two superimposed polymer layers. The present invention furthermore relates to a multilayer film obtainable by the process of the present disclosure which has at least one thin layer, in particular, with a thickness of 200 µm or less. The present invention furthermore relates to multilayer films wherein the top layer and the bottom layer each comprise a pressure-sensitive adhesive.

In a first aspect, a continuous self-metered process of forming a multilayer film comprising at least two superimposed polymer layers is provided. The process comprises the steps of:
 (i) providing a substrate;
 (ii) providing two or more coating knives which are offset, independently from each other, from said substrate and/or from an adjacent coating knife to form at least one substrate gap relative to the surface of the substrate and at least one outlet gap relative to the surface of an adjacent coating knife;
 (iii) moving the substrate relative to the coating knives in a downstream direction,
 (iv) providing curable liquid precursors of the polymers to the upstream side of the coating knives thereby coating the two or more precursors through the respective gaps as superimposed layers onto the substrate;
 (v) optionally providing one or more solid films and applying these essentially simultaneously with the formation of the adjacent lower polymer layer, and
 (vi) curing the precursor of the multilayer film thus obtained;
 wherein a lower layer of a curable liquid precursor is covered by an adjacent upper layer of a curable liquid precursor or a film, respectively, essentially without exposing said lower layer of a curable liquid precursor.

In a second aspect, a multilayer film is provided that is obtainable by the above method wherein, in particular, a release liner is attached in step (v) of said method to the exposed surface of the top layer of the precursor of the multilayer film essentially simultaneously with the formation of such top layer.

A preferred multilayer film obtainable with the method of the present invention comprises at least two layers wherein at least one exposed layer has a thickness between 30 to 200 µm, in particular of 50 to 150 µm.

BRIEF DESCRIPTION OF THE DRAWINGS

The current invention is described in more detail with the following examples and figures. The figures show in FIG. 1, which is a schematic representation of a coating apparatus to carry out a first embodiment of the inventive method.

DETAILED DESCRIPTION

The properties of multilayer films can be varied broadly by varying, for example, the composition of the layers, the sequence of the layers in the multilayer film or the respective thickness of the layers. Multilayer films can therefore be tailor-made for a broad variety of applications in different technical fields.

Multilayer films can be obtained, for example, by lamination of the corresponding single-layered films using conventional lamination equipment. The resulting multilayer films tend to delaminate, however, at the interfaces between the laminated layers when subjected to peel and/or shear forces, especially at elevated temperatures.

U.S. Pat. No. 4,818,610 (Zimmerman et al., U.S. Pat. No. '610)) discloses a pressure-sensitive adhesive tape comprising a plurality of superimposed layers wherein at least one outer layer is a pressure-sensitive adhesive layer. The adhesive tapes of U.S. Pat. No. '610 are prepared by sequentially coating liquid compositions each comprising at least one photopolymerizable monomer, onto a substrate. A liner can be attached to the top layer and the plurality of superimposed layers is cured by subjecting it to irradiation in order to provide the adhesive tape. The method of making the adhesive tape is illustrated in the Fig. of U.S. Pat. No. '610 which shows that the coating compositions form "rolling beads or banks" in front of the coating knives or the coating nip formed by a pair of rollers, respectively. The sequence of superimposed layers obtained by the method of U.S. Pat. No. '610 may be distorted by physical mixing occurring between the layers.

Sequential coating methods are furthermore disclosed in JP 2001/187,362-A (Takashi et al.) and in JP 2003/001, 648-A (Takashi et al.).

Figure 1:
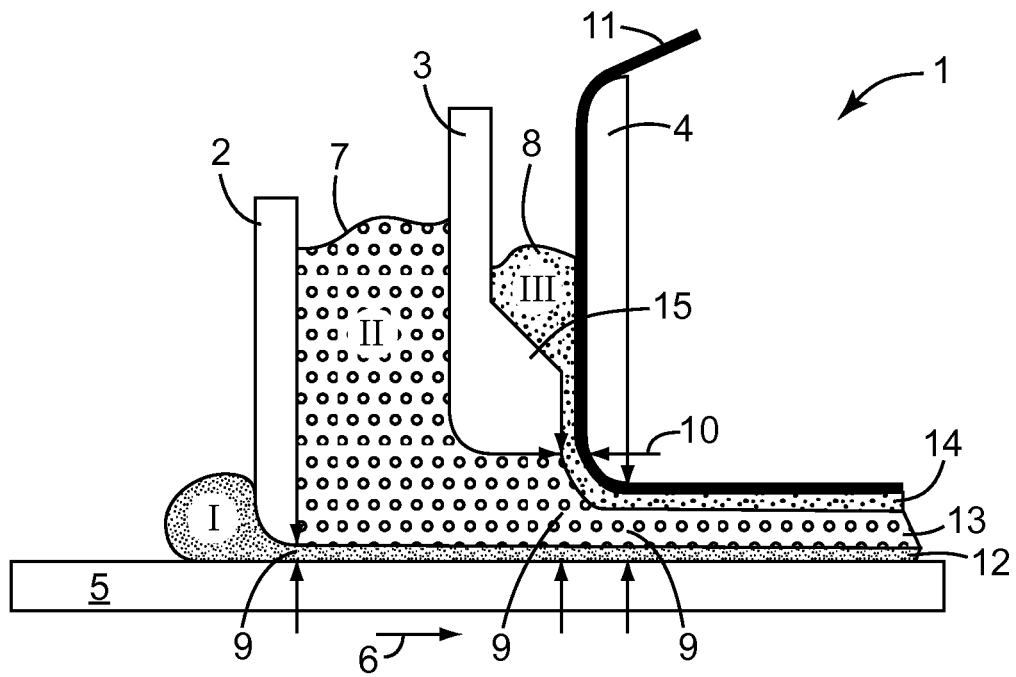

U.S. Pat. No. 4,894,259 (Kuller, U.S. Pat. No. '259) discloses a process of making a unified pressure-sensitive adhesive tape where a plurality of superimposed layers is concurrently coated onto a low-adhesion carrier by means of a co-extrusion die having multiple manifolds. The superimposed layers are subsequently subjected to irradiation in order to provide the adhesive tape. FIG. 1 of U.S. Pat. No. '259 illustrates a so-called openfaced photo-polymerization process where the topmost exposed layer is not covered with a UV-transparent release liner during the irradiation step so that the irradiation step needs to be conducted in an inert atmosphere. It is also disclosed in U.S. Pat. No. '259 that the photopolymerizable coating is covered with a plastic film which is transparent to UV radiation so that the superimposed layers can be irradiated through such film in air.

The die coating method of U.S. Pat. No. '259 is more complicated and expensive in comparison to the knife coating method of U.S. Pat. No. 4,818,610. The coating compositions need to be pumped through the die. According to S. F. Kistler and P. M. Schweizer [ed.], Liquid Film Coating, London 1997, Chapmann & Hall, p. 9, right column, die coating is referred to as a pre-metered coating process "in which the amount of liquid applied to the web per unit area is predetermined by a fluid metering device upstream, such as a precision gear pump, and the remaining task of the coating device is to distribute that amount as uniformly as possible in both the down-web and cross-web direction". The pump provides an essentially constant volume flow rate which together with the downweb speed of the low adhesion carrier of U.S. Pat. No. '259 mainly define the thickness of the coating layer. Pre-metered die-coating processes exhibit various short-comings. The pump introduces kinetic energy into the coated layers which may create a non-laminar flow pattern resulting in a high extent of physical mixing between the layers or thickness variations. Depending on the pump type used, the volume flow rate may exhibit oscillations or other variations which translate, for example, into thickness variations or other inhomogenities of the coating layers. The geometry of the manifolds of the die needs to be adjusted to the flow behavior of the coating compositions so that a specific die may not be usable in a flexible way for various coating processes. The UV-transparent plastic film is attached in U.S. Pat. No. '259 to the top layer subsequent to the die-coating step (i.e. outside of the die) which results, for example, either in the compression of the multilayer film or in the inclusion of air bubbles between the plastic film and the top layer due to tolerances that are present in any technical process. It is not possible to place the plastic film or any other film such as, for example, a release liner in a non-intrusive way on the multilayer stack of precursor layers so that such film would snugly fit to the exposed surface of the top layer of the multilayer stack. Compressing the multilayer stack introduces, for example, thickness variations or other inhomogenities into the multilayer stack. The liquid precursor may, for example, form a rolling bead at the position along the downstream direction where the liner compresses the stack which may introduce turbulences into the multilayer stack that finally leads to mixing of the layers. Leaving voids between the film and the exposed top surface allows oxygen to access the surface of the top layer which may inhibit curing of the precursor. It is also generally observed that in such cases the surface of the top layer is less smooth, i.e. exhibits a higher surface roughness Ra in comparison to a situation where the film is compressing the multilayer stack. Also, the formation of air bubbles is observed in the top layer.

Pre-metered die-coating processes of multilayer films are also disclosed, for example, in EP 0,808,220 (Leonard), U.S. Pat. No. 5,962,075 (Sartor et al.), U.S. Pat. No. 5,728,430 (Sartor et al.), EP 1,538,262 (Morita et al.) and DE 101 30 680 (Tomaru et al.). US 2004/0,022,954 (Tsuda et al.) discloses a pre-metered coating process wherein the coating layers are superimposed first before they are together transferred to the moving web substrate. A similar coating process is disclosed in U.S. Pat. No. 4,143,190 (Choinski).

WO 01/89,673-A (Hools) discloses a process of forming multilayered porous membranes wherein two or more solutions of a polymer are co-casted onto a support. The superimposed layers are then immersed into a coagulation bath to effect phase separation followed by drying to form a porous membrane. Coagulation occurs from the liquid film surface that first contacts the coagulation bath with subsequent diffusion of the coagulant through the layers of the multi-layered liquid sheet. The diffusion and coagulation process results in mixing at the interfaces between the superimposed layers.

Another method for a continuous self-metered process of forming a multilayer film is known from present Applicant's co-pending patent application PCT/US2011/022685 the disclosure of which is incorporated herein by reference. This method comprises the steps of:
  (i) providing a substrate;
  (ii) providing two or more coating knives which are offset, independently from each other, from said substrate to form a gap normal to the surface of the substrate;
  (iii) moving the substrate relative to the coating knives in downstream direction,
  (iv) providing curable liquid precursors of the polymers to the upstream surfaces of the coating knives thereby coating the two or more precursors through the respective gaps as superimposed layers onto the substrate;
  (v) optionally providing one or more solid films and applying these essentially simultaneously with the formation of the adjacent lower polymer layer, and
  (vi) curing the precursor of the multilayer film thus obtained;
wherein a lower layer of a curable liquid precursor is covered by an adjacent upper layer of a curable liquid precursor or a solid film, respectively, essentially without exposing said lower layer of a curable liquid precursor.

Although the method described in PCT/US2011/022685 may compensate for many of the drawbacks of the pre-metered coating processes of the production methods of the prior art it may sometimes be found difficult to provide thin individual layers, especially if the thin layer is not the first layer provided on the substrate and/or if the viscosity of the liquid precursor is high.

The present invention provides a method for a continuous self-metered process of forming a multilayer film which allows more precise control of the layer thickness, in particular, for thin precursor layers having a thickness of 200 µm (micrometers) or less and/or for precursor layers other than the layer first coated onto the substrate.

In particular, a continuous self-metered process of forming a multilayer film comprising at least two superimposed polymer layers is provided that comprises the steps of:
  (i) providing a substrate;
  (ii) providing two or more coating knives which are offset, independently from each other, from said substrate and/or from an adjacent coating knife to form at least one substrate gap relative to the surface of the substrate and at least one outlet gap relative to the surface of an adjacent coating knife;
  (iii) moving the substrate relative to the coating knives in a downstream direction,
  (iv) providing curable liquid precursors of the polymers to the upstream side of the coating knives thereby coating the two or more precursors through the respective gaps as superimposed layers onto the substrate;
  (v) optionally providing one or more solid films and applying these essentially simultaneously with the formation of the adjacent lower polymer layer, and
  (vi) curing the precursor of the multilayer film thus obtained;
wherein a lower layer of a curable liquid precursor is covered by an adjacent upper layer of a curable liquid precursor or a film, respectively, essentially without exposing said lower layer of a curable liquid precursor.

The present invention also relates to a multilayer film which is obtainable by the above method wherein, in particular, a release liner is attached in step (v) of said method to the exposed surface of the top layer of the precursor of the multilayer film essentially simultaneously with the formation of such top layer.

A preferred multilayer film obtainable with the method of the present invention comprises at least two layers wherein at least one exposed layer has a thickness between 30 to 200 µm, in particular of 50 to 150 µm.

The present invention provides a cost-effective, stable continuous process of forming a multilayer film comprising at least two superimposed polymer layers which does not exhibit the shortcomings of the state-of-the-art processes or exhibits them to a lower extent only, respectively. The present invention also provides a method of forming a multilayer film which is versatile and flexible and allows for the easy manufacture of complex structures comprising at least two polymer layers. The present invention also provides a multilayer film optionally including a further layer which was initially included as a solid film into the curable precursor of the multilayer film. Additionally the present invention discloses multilayer films comprising at least two layers wherein at least an exposed layer is a thin layer having a thickness of between 30 to 200 µm, in particular of 50 to 150 µm. It was surprisingly found that such thin layer has a low thickness variation and/or can be obtained from precursors having a coating viscosity in a wide range of preferably between 2,500-20,000 mPas at 25° C.

In the continuous self-metered coating process of the present invention two or more curable liquid precursors of polymeric materials are coated onto a substrate and cured to provide a multilayer film comprising at least two superimposed polymer layers. The layers are applied via two or more coating knives which are offset, independently from each other, from said substrate and/or from an adjacent coating knife to form at least one substrate gap relative to the surface of the substrate and at least one outlet gap relative to the surface of an adjacent coating knife, respectively.

The substrate gap relative to the surface of the substrate preferably is essentially normal to the substrate between the transversally extending bottom edge of the coating knife and the surface of the substrate or the surface of a preceding coating layer formed by one or more preceding coating knives. Although the effective substrate gap seen by a precursor coated at a specific substrate gap onto a precursor layer previously coated is the distance between the transversally extending bottom edge of the coating knife and the exposed surface of the previously coated precursor layer, the substrate gap is measured for convenience reasons in each case between the transversally extending bottom edge of the respective coating knife and the substrate, irrespective of whether such gap forms the precursor layer firstly applied to the substrate or a subsequent precursor layer. This notation is shown in the figures where the substrate gap is marked by reference number 9.

The outlet gap relative to the surface of an adjacent coating knife forms the outlet of the coating chamber bordered by the two adjacent coating knives so that the outlet gap is arranged close to the laterally extending bottom edge of at least one of the adjacent coating knives. The width of the outlet gap may be, for example, essentially parallel to the substrate (see, for example, FIGS. 1-3 below) or such width may form an angle with the substrate which preferably is different from 90° (see, for example, FIGS. 5 and 5a below). The outlet gap of a coating chamber preferably is at least 5 times and more preferably at least 10 times smaller than the average width of the coating chamber bordered by the two adjacent knives in the downstream direction. The width of the outlet gap which is the smallest distance between the adjacent knives in the outlet area preferably is between 50 µm and 1,500 µm and more preferably between 100 and 1,000 µm, respectively. The downstream coating knife of the pair of adjacent coating knives forming an outlet gap, preferably also forms a substrate gap as is illustrated, for example, in FIGS. 1-3 and 5a and 5b below.

It was found that precursor layers formed at an outlet gap exhibit a highly uniform thickness in the downstream direction. The average deviation of the thickness of such layers in a direction normal to the downstream direction preferably is over an arbitrarily selected distance of at least 10 mm less than 10% and more preferably less than 5%. It was furthermore found that precursor layers formed at an outlet gap can exhibit a low thickness of preferably less than 200 µm and preferably between 25 and 150 µm. While the precursor layer applied directly and/or first onto the substrate can be advantageously formed with a low thickness of less than 200 µm with both a substrate gap and an outlet gap, subsequent layers with a low thickness of less than 200 µm are more easily and/or with a higher uniformity formed at outlet gaps. The thickness of the precursor layer formed at an outlet gap is thus largely determined by the width of the outlet gap between adjacent coating knives while the substrate gap between the downstream knife of the pair of adjacent knives forming the outlet gap and the substrate influences the thickness of such layer only to a lesser and/or minor extent. It was also found that uniform and/or thin precursor layers with a thickness of less than 200 µm can be formed at an outlet gap largely independently from the viscosity of the liquid precursor over a wide range of viscosities of preferably between 1,000 and 20,000 mPas at 25° C. The thickness and/or uniformity of a precursor layer applied via an outlet gap between two adjacent coating knives can thus be widely controlled also for low layer thicknesses of less than 200 µm what may be advantageous, in particular, if a multitude of layers is superimposed and/or the viscosity of the precursor is higher than that of the preceding and already deposited precursor layer.

The present invention uses a combination of at least one substrate gap and at least one outlet gap for forming a broad variety of advantageous stacks of two or more precursor layers. Substrate gaps allow, for example, the use of precursor layers over a broad range of thicknesses and, in particular, precursor layers with a relatively high thickness of more than 200 µm. The thickness of the precursor layers obtained at substrate gaps usually depends on the viscosity of the liquid precursor which can used to optimize specific coating requirements. Precursor layers formed at outlet gaps may have a low thickness of, for example, less than 200 µm essentially independently from the viscosity of the precursor so that the thickness can be broadly varied in the stack of precursor layers to be cured into the multilayer film. Also, it is usually preferred that the laterally extending bottom edge of the downstream knife of a pair of adjacent knives forming an outlet gap, is arranged closer to the substrate than the laterally extending bottom edge of the upstream coating knife of such gap so that the downstream knife forms a substrate gap adjacent to the outlet gap.

The term adjacent as used above and below refers to two elements of the coating apparatus arranged next to each other. If two adjacent coating knives are arranged so that an outlet gap is formed the narrowest distance between such adjacent coating knives in the bottom area of at least one coating knife and/or in the outlet area of the coating chamber bordered by the two adjacent coating knives, respectively, is distinctly less than the average width of such coating chamber in the downstream direction. Preferably, the width of the outlet gaps is at least 5 times smaller and more preferably at least 10 times smaller than the average width of the coating chamber in the downstream direction. The space formed between the two adjacent coating knives and lateral walls is referred to as a coating chamber which is filled with the liquid precursor to be applied via the gap formed between the adjacent coating knives. The term adjacent as used above and below also refers to two superimposed layers within the precursor multilayer film or the cured multilayer film which are arranged directly next to each other, i.e. which are abutting each other.

The term superimposed as used above and below means that two or more of the layers of the liquid precursors of the polymers or of the polymer layers of the multilayer film, respectively, are arranged on top of each other. Superimposed liquid precursor layers may be arranged directly next to each other so that the upper surface of the lower layer is abutting the lower surface of the upper layer. In another arrangement superimposed liquid precursor layers are not abutting each other but are separated from each other by one or more liquid precursor layers and/or one or more solid films or webs.

The terms top and bottom layers, respectively, are used above and below to denote the position of a liquid precursor layer relative to the surface of the substrate bearing the precursor layer in the process of forming a multilayer film. The precursor layer arranged next to the substrate surface is referred to as bottom layer whereas the precursor layer arranged most distantly from the substrate surface in a direction normal to the substrate surface is referred to as top layer. It should be noted that the terms top and bottom layer used above and below in conjunction with the description of the method of manufacturing the multilayer films do not have an unambiguous meaning in relation to the multilayer films as such. The term bottom layer is unambiguously defined in relation to the method of the present disclosure as the layer adjacent to the substrate of the coating apparatus. Likewise, the outer layer of the precursor of the multilayer film which is opposite to the bottom layer and which is applied last during the method is unambiguously referred to above and below as top layer. Contrary to this, when referring to the cured multilayer film as such, its two opposite outmost layers are termed above and below for clarity reasons as outer layers.

The terms superimposed and adjacent likewise apply to the cured polymer layers and the cured multilayer film, respectively.

The term precursor as used above and below denotes the material from which the polymers of the corresponding polymer layers of the multilayer film can be obtained by curing. The term precursor is also used to denote the stack of layers comprising at least two layers of liquid precursors from which the multilayer film of the present disclosure can be obtained by curing. Curing can be effected by curing with actinic radiation such as UV, γ (gamma) or e-beam radiation or by thermal curing.

The process of the present disclosure employs a substrate onto which the two or more layers of the liquid precursors are coated, and two or more coating knives which are offset independently from each other from the surface of the substrate receiving the precursor to form at least one substrate gap which preferably is normal to the surface of the substrate, or to the surface of the adjacent coating knife, respectively, to form an outlet gap.

The direction into which the substrate is moving is referred to above and below as downstream direction. The relative terms upstream and downstream describe the position along the extension of the substrate. A second coating knife which is arranged in a downstream position relative to a first coating knife is also referred to above and below in an abbreviated manner as downstream coating knife relative to the first (upstream) coating knife.

The coating knives useful in the present disclosure each have an upstream side (or surface), a downstream side (or surface) and a bottom portion facing the surface of the substrate receiving the precursor of the multilayer film. A substrate gap formed between a coating knife and the substrate or the surface of a preceding liquid precursor layer, respectively, is measured in each case as the minimum distance between the bottom edge of the coating knife and the exposed surface of the substrate. An outlet gap formed between two adjacent coating knives is measured in each case as the minimum distance between the downstream surface of the upstream coating knife and the upstream surface of the adjacent downstream coating knife in the outlet area of the coating chamber formed by the adjacent knifes. The outlet of the coating chamber is its opening facing the substrate. The gap can be essentially uniform in the transverse direction (i.e. in the direction normal to the downstream direction) or it may vary continuously or discontinuously in the transverse direction, respectively.

The cross-sectional profile of the coating knives used may vary widely to provide the desired substrate gap between the bottom portion of the coating knife and the substrate or the outlet gap between adjacent coating knives, respectively.

The transversely extending bottom edge of a coating knife forming a substrate gap relative to the substrate is designed so that the precursor layer is formed and excess precursor is doctored off. The cross-sectional profile of the bottom portion of such coating knife can vary widely, and it can be, for example, essentially planar, curved, concave or convex. The profile can be sharp or square, or it can have a small radius of curvature providing a so-called bull-nose. A hook-type profile may be used to avoid a hang-up of the trailing edge of the precursor layer at the knife edge.

The coating knives forming a substrate gap can be arranged essentially normal to the surface of the web, or they can be tilted whereby the angle between the web and the downstream surface of the coating knife preferably is between 50° and 130° and more preferably between 80° and 100°.

An outlet gap between two adjacent coating knives may be formed by arranging the downstream surface of the bottom portion of the upstream coating knife of the pair of adjacent coating knives so that it is next to and/or faces the upstream surface of the downstream coating knife thereby forming a narrowed outlet of the coating chamber formed by the two coating knives. The term narrowed means that the minimum width between the downstream surface of the upstream coating knife and the upstream surface of the downstream coating knife, respectively, in the outlet area of the coating chamber is distinctly less than the average width of the coating chamber in the downstream direction. In such embodiment the downstream surface of the upstream coating knife and the upstream surface of the downstream coating knife form an angle different from 0° relative to each other, i.e. they are not parallel to each other. The angle may vary broadly and preferably is acute between 20 and 80° and more preferably between 30 and 70°. It is, however, also possible that such angle is 80° or 90° or larger.

In another embodiment of an outlet gap formed between two adjacent coating knives the bottom portion of the upstream coating knife of the two adjacent coating knives is arranged essentially opposite to the downstream coating knife so that the gap corresponds to the smallest distance between the two knives beneath the bottom portion of the upstream knife. In this embodiment the downstream surface of the upstream coating knife and the upstream surface of the downstream coating knife preferably form an angle which may vary broadly and preferably is acute between 20 and 80° and more preferably between 30 and 70°.

In another embodiment of an outlet gap formed between two adjacent coating knives the width of at least one of the adjacent coating knives in the downstream direction varies along its height so that the width of the coating knife is, in particular, larger in its bottom area in comparison to its width outside of such bottom area. If such coating knife is arranged next to an adjacent coating knife a coating chamber is formed which exhibits a narrowed outlet in the bottom area of the coating knife having an enlarged width in its bottom area. The width of such gap can be further modified by varying the width of the second of the adjacent coating knives along its height and/or by arranging the two coating knives so that the downstream surface of the upstream coating knife exhibits an angle and preferably an acute angle relative to the upstream surface of the downstream coating knife.

The above description of preferred embodiments of gaps formed between two adjacent coating knifes is illustrative only and by no means limiting.

The bottom portion of the coating knives is preferably selected to extend at least across the desired width of the coating in a direction essentially normal to the downstream direction. The coating knife is preferably arranged opposite to a roll so that the substrate is passing between the transversely extending bottom edge of the coating knife and the roller. Thus the substrate is supported by the roller so that the substrate is not sagging in a direction normal to the downstream direction. In this arrangement the gap between the coating knife and the surface of the substrate can be adjusted precisely. If the coating knife is used in an unsupported arrangement, the substrate is held in place by its own tension but may be sagging to some extent in a direction normal to the downstream direction. Sagging of the substrate can be minimized by arranging the coating knife over a short span of the substrate between adjacent rollers. If a continuous substrate is used, sagging can be further minimized by guiding it over an endless conveyor belt. Another option to avoid/minimize sagging is guiding the substrate over a rigid surface.

The coating knives useful in the present disclosure are solid, and they can be rigid or flexible. They are preferably made from metals, polymeric materials, glass or the like. Flexible coating knives are relatively thin and preferably have an average width of between 0.1 and 0.75 mm in the downstream direction and they are preferably made of flexible steels such as stainless steel or spring steel. Rigid coating knives can be manufactured of metallic or polymeric materials, and they usually have an average width of at least 1 mm, preferably at least 3 mm in the downstream direction. A coating knife can also be provided by a continuously supplied polymer film which is tensioned and appropriately deflected by rollers, bars, rods, beams or the like to provide a transversely extending coating edge facing the substrate. If desirable, the polymer film can simultaneously be used as a release liner or as a solid film incorporated into the precursor of the multilayer film.

In the present invention a lower layer of a curable liquid precursor (i.e. any layer different from the top layer) is coated with an adjacent upper layer of a curable liquid precursor or a solid film, respectively, essentially from its onset. Thus, the lower curable liquid precursor layer is directly covered by the adjacent upper layer of a curable liquid precursor layer or by the solid film, respectively, essentially without exposing said lower curable liquid precursor layer. A solid film is preferably applied along the upstream side of the coating knife which also provides the lower layer of a curable liquid precursor. The film is thus attached to the upper surface of the lower layer essentially during the formation of said layer and the lower layer is not exposed. Directly depositing an upper layer of a curable liquid precursor onto the upper surface of said lower layer without exposing such upper surface of the lower layer can be accomplished by appropriately arranging the two coating knives forming the two layers. In one embodiment, the liquid precursors are applied via two coating stations abutting each other in the downstream direction whereby the back walls of the coating chambers comprise or form, respectively, the coating knives. The lower layer when formed by the corresponding coating knife is thus directly covered with the curable liquid precursor of the upper layer contained in the corresponding coating chamber. Generally the coating knife forming the upper layer needs to be arranged so that the lower layer, upon its formation at the corresponding coating knife, is essentially directly covered with the curable liquid precursor forming the upper layer.

In another embodiment, a solid film such as, in particular, a release liner is applied to the exposed surface of the top layer essentially simultaneously with the formation of such top layer. The solid film can be applied, for example, along the upstream surface of the most downstream coating knife (i.e. the back wall) of the coating apparatus. In this embodiment the solid film is smoothly attached to the exposed surface of the top layer in a snug fit thereby avoiding a compression of the top layer or the multilayer stack, respectively, or the inclusion of air between the solid film and the exposed surface of the top layer.

Although the present inventors do not wish to be bound by such theory, it is speculated that the above deposition of a solid film or of the liquid precursor forming the adjacent upper layer, respectively, onto the lower liquid precursor layer essentially simultaneously with the formation of the lower layer by means of coating knives results in multilayer films characterized by superior properties. The multilayer films of the present disclosure exhibit well-defined layers. Due to the wet in wet production, in which mostly uncured compositions are superimposed, diffusion of in particular smaller monomers like acrylic acid can occur at the interface between adjacent layers. It is further believed that the inventive PSA films develop chemical bonds extending from one layer to the adjacent layer which might possibly be even more pronounced by monomer diffusion across the interface. This might be an explanation for the strong anchorage observed between adjacent layers so that the films of the present disclosure typically exhibit a higher T-peel strength than corresponding films of the prior art obtained by co-extrusion of the corresponding layers and post-curing.

In an embodiment of the present disclosure, the precursor of the multilayer film is obtained by using a coating apparatus comprising one or more coating stations. The coating stations may comprise one or more coating chambers and, if desired, a rolling bead upstream to the most upstream coating chamber. The coating chambers each have an opening towards the substrate moving beneath the coating chambers or towards an adjacent coating knife, respectively, so that the liquid precursors are applied as layers superimposed onto each other. The liquid precursor of the rolling bead is applied, for example, via the upstream surface of the most upstream coating knife.

The coating chambers each have an upstream wall and a downstream wall preferably extending essentially transversely with respect to the downstream direction. The most upstream wall of the coating apparatus is also referred to as front wall and the most downstream wall as back wall of the coating apparatus, respectively. In case two or more coating chambers are present, the downstream wall of an upstream coating chamber preferably is in an essentially abutting arrangement with the upstream wall of the adjacent downstream coating chamber. This means that the distance between the downstream wall of an upstream coating chamber and the upstream wall of the adjacent coating chamber preferably is less than 2.5 mm, more preferably less than 1 mm and especially preferably there is no distance at all between these walls. In a particular embodiment, the downstream wall of an upstream coating chamber and the upstream wall of the adjacent downstream coating chamber are integrated into one wall which is referred to above and below as an intermediate wall.

The downstream walls each comprise a coating knife facing the substrate or an adjacent coating knife, respectively. At least one of the coating knives is arranged above the exposed surface of the substrate onto which the liquid precursors are attached thereby providing for clearance between the bottom portion of the coating knife facing the substrate and the exposed surface of the substrate or the exposed layer of the liquid precursor or precursors attached previously (substrate gap), respectively; and at least one other coating knife is arranged relative to an adjacent coating knife so that a narrow outlet is formed at the outlet of the coating chamber formed between such adjacent coating knives thereby limiting the flow of the liquid precursor through such outlet (outlet gap). The distance between the transversely extending bottom edge of the coating knife and the surface of the substrate as measured in a direction essentially normal to the surface of the substrate or the minimum distance between two adjacent coating knives in the area of the outlet of the corresponding coating chamber is referred to above and below as a substrate gap or as an outlet gap, respectively. The liquid precursors are supplied from the coating chamber to the upstream side of the respective substrate gap and/or to the outlet formed between two adjacent gaps, respectively.

The width of a substrate gap is adjusted to regulate the thickness of the respective coating in conjunction with other parameters including, for example, the speed of the substrate in the downstream direction, the thickness normal to the substrate of the liquid precursor layers or solid films, respectively, already applied, the viscosity of the liquid precursor to be applied through the respective gap, the viscosity of the liquid precursor(s) already applied, the kind, form and profile of the coating knife, the angle with which the coating knife is oriented relative to the normal of the substrate, the position of the knife along the extension of the coating apparatus in the downstream direction and the kind of the substrate.

The width of an outlet gap is adjusted to regulate the thickness of the respective coating in conjunction with other parameters. It is, for example, preferred that the downstream knife of the two adjacent coating knives is arranged to provide both an outlet gap relative to the adjacent upstream coating knife and a substrate gap relative to the surface of the substrate. This can be achieved, for example, in that the distance between the bottom edge of the upstream coating knife and the surface of the substrate is higher than the distance between the bottom edge of the downstream coating knife and the surface of the substrate. Other factors include, for example, the kind, form and profile of the coating knife, the angle with which one of the adjacent coating knife is oriented relative to the other of the adjacent coating knives or the position of one of the adjacent coating knives relative to the longitudinal extension of the other of the adjacent coating knives whereas the speed of the substrate and the viscosity of the liquid precursor layers already applied is typically of lesser influence for the coating at outlet gaps.

The width of an outlet gap formed between two adjacent coating knives is preferably adjusted to 1 to 10 times of the desired thickness of the precursor layer to be formed at such outlet gap and, in particular, to 1.2 to 5, especially 1.5 to 4 times of such desired thickness.

The coating knife can be a separate element attached to the respective downstream wall or it can form the downstream wall, respectively. It is also possible that one or more downstream walls are provided as solid films such as release films.

The knife profile can be optimized for a specific liquid precursor supplied through a coating chamber by using a rotatable coating knife device equipped with several coating knives having a different knife profile. The person skilled in the art can thus quickly change the coating knives used as back wall, front wall or intermediate walls, respectively, in the different coating chambers and evaluate the optimum sequence of coating knife profiles in a coating apparatus for manufacturing a specific multilayer film.

If the coating apparatus useful in the present invention comprises only one coating chamber both the upstream wall and the downstream wall of the coating chambers comprise or form, respectively, coating knives. The liquid precursor can be supplied to the upstream edge of the front wall, for example, by means of a so-called rolling bead, or it can be supplied by any kind of hopper or nozzle.

If the coating apparatus of the present invention comprises two or more coating chambers, the front wall may or may not form a coating knife. If the front wall does not form a coating knife it may be arranged so that there is essentially no gap between the transverse extension of the bottom portion of the front wall facing the substrate and the exposed surface of the substrate so that an upstream leakage of the liquid precursor is reduced and/or minimized. If the front wall is a coating knife, the profile of its bottom portion may be formed so that an upstream leakage of the liquid precursor contained in the first upstream coating chamber is suppressed. This can be achieved, for example, by using an essentially radius type profile of the transversely extending edge of the front wall facing the substrate.

The coating cambers each have a downstream wall, an upstream wall and two or more side walls essentially extending in the downstream direction, whereby the downstream wall of an upstream chamber and the upstream wall of an adjacent downstream chamber may be integrated into one intermediate wall. The cross-section of the coating chambers in the downstream direction can vary broadly and can be, for example, square, rectangular, polygonal, funnel-shaped or regularly or irregularly curved. The downstream wall, upstream wall and/or the side walls may be present as separate elements but it is also possible, for example, that a coating chamber is formed as one piece or that the upstream walls and the side walls, for example, are formed as one piece separate from the downstream wall coating knife. It is generally preferred that the downstream wall is a separate element or piece so that the coating knives representing the downstream wall can be easily replaced, for example, by means of a revolvable coating knife device. In case the coating apparatus comprises two or more coating chambers their respective cross-sections are preferably selected that adjacent coating chambers can be arranged in an essentially abutting configuration in the downstream direction. The upstream walls and the downstream walls of the coating chambers preferably are essentially straight in the direction transverse to the downstream direction.

The average extension of a coating chamber in the downstream direction, i.e. the average distance between the front wall and the back wall of a coating chamber is preferably between 5 mm and 500 mm and more preferably between 10 and 500 mm. Although the present inventors do not wish to be bound by such theory it is speculated that if the distance between the front wall and the back wall is too small, the flow of the liquid precursor towards the gap tends to become instable which results in undesirable coating defects such as, for example, streaks or "brushmarks". If the distance between the front wall and the back wall of the coating chamber is too large, the continuous flow of the liquid precursor towards the gap may rupture so that the continuous coating of the moving substrate may cease and/or mixing might occur. The flow pattern in a coating chamber or trough is discussed in more detail in U.S. Pat. No. 5,612,092 (Strenger et al.), col. 4, ln. 51 to col. 5, ln. 56. This passage is incorporated by reference into the present specification.

The volume of the coating chambers is defined by their respective cross-section parallel to the surface of the substrate and their respective height normal to the surface of the substrate. The height of the coating chambers preferably is between 10 and 1,000 mm (millimeters) and more preferably between 25 and 250 mm. The volume of the coating chambers is preferably selected as a function of the coating width transverse to the downstream direction.

The dimensions of the coating chambers provided above are exemplary only and by no means limiting.

The coating chambers may be fitted with heating or cooling means so that the viscosity of the liquid precursors can be controlled and adjusted if necessary.

The liquid precursors are preferably applied under ambient pressure so that the volume flow of the precursors mainly results from the shear forces acting on the precursors as a result of the movement of the substrates and, optionally, of the solid films or webs introduced into the precursor multilayer film. The volume flow of the liquid precursors is supported by the hydrostatic pressure of the precursor comprised in the respective coating chamber. It is preferred in the method of the present invention that the force resulting from the hydrostatic pressure is low in comparison to the drag force or forces exerted by the moving substrate and, optionally, moving solid films. The height of the liquid precursor in a coating chamber is preferably controlled so that such height corresponds to at least the width of the coating chamber in the downstream direction throughout all of the coating process. If the height of the liquid precursor in a coating chamber is less than the width of the coating chamber in downstream direction partial mixing of the precursor applied through such coating chamber with an adjacent lower precursor layer may occur. The height of the liquid precursor in the respective coating chamber is preferably kept essentially constant.

It is also possible that the coating chambers are pressurized with air or an inert gas such as nitrogen or argon. The coating apparatus may be equipped so that the coating chambers may be pressurized separately and individually which may be desirable, for example, to counterbalance differences in viscosity between the different liquid precursors or differences in height of the liquid precursor column in the coating chambers. Preferably, the coating chambers are not completely filled with the respective liquid precursor so that the liquid precursor is pressurized via a gas atmosphere arranged on top of the liquid precursor. The total over-pressure exerted onto the respective liquid precursor is selected so that the process continues to run in a self-metered fashion, i.e. so that there is no inverse proportionality between the wet coating thickness of a precursor layer and the downweb speed of the substrate. The total over-pressure exerted onto the respective liquid precursor preferably is less than 0.5 bar and more preferably not more than 0.25 bar. In an especially preferred embodiment no gas over-pressure is applied, i.e. the process of the present disclosure is preferably run under ambient conditions.

The substrate is moved relatively to the coating knives in the downstream direction to receive a sequence of two or more layers of the liquid precursors which are superimposed onto each other in a direction normal to the downstream direction.

The substrate can be a temporary support from which the multilayer film is separated and removed subsequent to curing. When used as a temporary support the substrate preferably has a release coated surface adapted to allow for a clean removal of the cured multilayer film from the substrate. It may be desirable that the substrate when providing a temporary support remains attached to the multilayer film when winding it up, for example, for storage. This is, for example, the case if the bottom layer of the multilayer film is an adhesive layer such as a pressure-sensitive adhesive layer. The release-coated substrate protects the surface of the pressure-sensitive adhesive layer, for example, from contamination and allows the multilayer film to be wound up into a roll. The temporary substrate will then only be removed from the multilayer film by the final user when attaching the multilayer film to a surface, for example. In other embodiments where the surface of the first layer of the multilayer film facing the substrate does not need to be protected, the substrate providing a temporary support may be removed and wound up subsequent to curing the precursor layers and prior to storing the multilayer film. In another embodiment, the substrate providing a temporary support may be provided by an endless belt preferably having an exposed release surface. The multilayer film obtained after curing the stack of layers of liquid precursors separates from the endless belt and can be wound up, for example.

Alternatively, the substrate can be integrated as a layer into the resulting multilayer film. In such case, the substrate is continuously fed as a film or web and collected as a part of the multilayer film subsequent to the curing of the liquid precursor layers. The surface of the substrate may preferably be subjected, for example, to a corona treatment to enhance the anchoring of the cured bottom polymeric layer to the substrate. Anchoring of the bottom polymeric layer to the substrate may also be improved by applying a so-called tie layer onto the surface of the substrate prior to coating the bottom liquid precursor layer to the substrate. Tie layers which are suitable in the present disclosure include, for example, 3M Primer 4297, a polyamide based primer commercially available from 3M Co. or 3M Primer 4298, a primer comprising an acrylic polymer and a chlorinated polyolefin as active substances which is commercially available from 3M Co.

Substrates which are suitable both as temporary substrates or as substrates for incorporation into the multilayer film, respectively, can be selected from a group comprising polymeric films or webs, metal films or webs, woven or non-woven webs, glass fibre reinforced webs, carbon fibre webs, polymer fibre webs or webs comprising endless filaments of glass, polymer, metal, carbon fibres and/or natural fibres. Depending on the nature of the liquid precursor applied as a bottom layer onto the substrate and on whether the substrate is used as a temporary support or as an integral layer of the multilayer film, the person skilled in the art can decide without any inventive input whether a treatment of the substrate surface is required or desirable. It was found by the present inventors that the method of the present disclosure is relatively insensitive to the roughness of the exposed surface of the substrate. The surface roughness can be characterized by the arithmetic average surface roughness $R_a$ which can be measured, for example, by laser profilometry. Polymeric films suitable for use in the present disclosure may have $R_a$ values of, for example, 1-20 μm or more preferably of 1-10 μm whereas non-woven webs may have $R_a$ values of between 10 and 150 μm and more preferably between 15 and 100 μm. The multilayer films obtainable by the method of the present disclosure exhibit, essentially independent of the surface roughness $R_a$ of the substrate, a bottom polymer layer with a homogenous thickness along the extension of the web in the downstream direction. The average deviation of the thickness of the bottom polymer layer in a direction normal to the downstream direction preferably is over an arbitrarily selected distance of 10 mm less than 10%, more preferably less than 5% and especially preferably less than 2.5%.

If the substrate is used as a temporary support its optionally release treated surface facing the coating knives preferably is essentially impermeable with respect to the liquid precursor applied to the substrate.

If the substrate forms an integral part of the multilayer film subsequent to curing the precursor of the multilayer film, it is also desirable that the optionally treated surface of the substrate is essentially impermeable with respect to the bottom precursor layer or that the bottom liquid precursor does at least not migrate to the opposite surface of the substrate prior to curing, respectively. In case of substrates having a certain porosity such as, for example, non-woven substrates or paper it may be desirable that the liquid precursor penetrates into the surface area into the bulk of the substrate, respectively, so that the interfacial anchorage between the first polymer layer and the surface of the substrate is improved. The penetration or migration behavior of the liquid precursor relative to a given substrate can be influenced, for example, by the viscosity of the liquid precursor and/or the porosity of the substrates.

In a particularly preferred process of this invention the flow of the liquid precursors through the respective outlet gap formed by adjacent coating knives is supported by applying a solid film along the upstream surface of the downstream coating knife of such outlet gap or by using such solid film being guided if desirable by appropriate rollers, as the downstream coating knife of the pair of adjacent coating knives, respectively. If the solid film is applied via the upstream surface of the most downstream coating knife it preferably is a release liner. The application of a solid film via the upstream surface of the downstream coating knife of such outlet gap is advantageous as said solid film supports the flow of the liquid precursor through the outlet gap by exerting a drag force on the liquid precursor. Also, the liquid precursor is covered by the solid film before the liquid precursor is brought into contact with the preceding precursor layers which protects the top precursor layer against the ambient atmosphere. It was generally found that liquid precursor layers provided by outlet gaps wherein a solid film is applied along the upstream surface of the respective downstream coating knife of such gap exhibit a uniform thickness even at higher production speeds. The thickness of the liquid precursor layer coated through such solid film supported outlet gaps can be varied broadly and it is, in particular, possible to obtain low thicknesses of between 10 and 200 μm and more specifically between 50 and 150 μm.

In another preferred process according to this invention, the precursor of the multilayer film of the invention comprises at least three layers wherein the outer layers have a lower thickness than the intermediate layer(s) and wherein the thickness of the outer layers is at least 50% lower than the thickness of the intermediate layer(s). In a preferred embodiment of such precursor of a multilayer film or the resulting multilayer film, respectively, with 3 or more layers the precursors of the bottom and/or top layers or the resulting polymeric layers are substantially free of cavities in the form of gas cavities surrounded by the polymer matrix of the cured polymer layers which may be provided by directly stirring in gas bubbles (frothing), by blowing agents, by polymeric or glass hollow microspheres or by expandable or pre-expanded polymeric microspheres comprising a polymer shell enclosing a gaseous atmosphere such as, for example, pentane. The top and bottom layers also are preferably free of fibers such as natural fibres, polymers fibres, carbon fibres or endless filaments of glass, polymer or metal, fiber pulps and the like. The advantage is that this allows to optimize the top and bottom layers regarding their adhesive properties whereas the foam functionality, for example, can be integrated into at least one of the intermediate layer or layers, respectively. When providing the essentially cavity-free and/or fiber-free top and bottom layer via outlet gaps such layers can be provided in a low thickness of, for example from 10 to 150 μm or more preferably from 20-120 μm. Such thin top and bottom layers are often referred to as so-called "skin layers".

The process of the present invention thus provides, in particular, skin-foam-skin multilayer-layer or, in particular, triple-layer films. In such embodiments, at least one of the intermediate layers comprises a foam material comprising gas cavities surrounded by the polymer matrix of the cured polymer layers which may be provided by directly introducing gas bubbles (frothing), blowing agents, polymeric or glass hollow microspheres or expandable or pre-expanded polymeric microspheres comprising a polymer shell enclosing a gaseous atmosphere such as, for example, pentane.

The top layer and the bottom layer of the multilayer film obtainable by the method of the present invention preferably comprise a pressure-sensitive adhesive properties and they each preferably have a thickness independently from each other from 10 to 200 μm, in particular from 50 to 150 μm.

In another preferred embodiment of multilayer film obtainable in the present invention comprises at least three layers wherein the outer layers have a lower thickness than the intermediate layer(s) and wherein the thickness of the outer layers is at least 50% lower than the thickness of the intermediate layer(s).

In substrate gaps the thicknesses of the liquid precursor layers normal to the substrate are mainly influenced by the gap between the bottom portion of the coating knife and the surface of the substrate, the respective viscosities of the liquid precursors and the downstream speed of the substrate.

The thicknesses of the liquid precursor layers obtained in substrate gaps preferably are independent of each other in the range from 100 µm and 3,000 µm, more preferably between 150 µm and 2, 000 µm and especially preferably between 250 µm and 1,500 µm. The desirable thickness of a coating layer depends, for example, on the nature of the liquid precursor and the resulting cured polymer layer.

The width of substrate gaps required to provide a desired value of the thickness of the precursor layer depends on various factors such as the profile of the coating knife, the angle of the coating knife normal to the substrate, the downstream speed of the substrate, the number of layers of liquid precursors to be coated, the absolute values of the viscosities of the liquid precursors and the ratio of the absolute values of the viscosity of a specific precursor with respect to the absolute viscosity values of the liquid precursor present in adjacent layers. Generally, the width of the substrate gap needs to be larger than the desired thickness of the respective layer of the liquid precursor regulated by such gap. It is disclosed, for example, in Kirk-Othmer, Encyclopedia of Chemical Technology, $4^{th}$ ed., ed. by J. Kroschwitz et al., New York, 1993, vol. 6, p. 610, as a rule of thumb that the thickness of the liquid precursor layer obtained by means of a coating knife arranged essentially normal to the substrate and having a transversely extending bottom portion with a square profile arranged in parallel to the substrate is about half the width of the gap for a wide range of substrate speeds.

The width of substrate gaps is measured in each case as the minimum distance between the bottom portion of the coating knife facing the substrate and the exposed surface of the substrate. The gap is preferably adjusted to a value from 20 µm and 3,000 µm and more preferably between 100 µm and 2,500 µm.

The Brookfield viscosity of the liquid precursors at 25° C. preferably is between 100 and 50,000 mPa·s, more preferably between 500 and 30,000 mPa·s and particularly preferred between 1,000 and 25,000 mPa·s. If the liquid precursor comprises solid particles such as, for example, pigments or thermally and/or electrically conducting particles, the viscosity of the liquid precursor preferably is between 1,000 and 30,000 mPa·s and more preferably between 3,000 and 25,000 mPa·s.

It was found by the present inventors that liquid precursors having a lower Brookfield viscosity can be coated faster and thinner through both substrate and outlet gaps, respectively. If a layer thickness of the liquid precursor of less than 500 µm is required, the Brookfield viscosity of the liquid precursor preferably is less than 15.000 mPa·s and more preferably between 500 mPa·s and 12.500 mPa·s.

If the viscosity of the liquid precursor is less than about 100 mPa·s, the coated layer tends to get unstable and the thickness of the precursor layer may be difficult to control. If the viscosity of the liquid precursor is higher than about 50,000 mPa·s, coating of homogeneous films tends to get difficult due to high shear forces induced by the high viscosity. If the liquid precursor comprises curable monomers and/or oligomers the viscosity of the precursor may be increased in a controlled way within the ranges given above by partially polymerizing the precursor to provide a desirable coatability. Alternatively, the viscosity of the liquid precursor may be increased and adjusted by adding thixotropic agents such as fumed silica and/or polymer adds such as block-copolymers (SBRs, EVAs, polyvinylether, polyalphaolefins), silicones or acrylics. The viscosity of the liquid precursor may also be decreased, for example, by increasing the amount of curable monomers and/or oligomers.

It was found that when applying the liquid precursors through a substrate gap, the ratio of the Brookfield viscosities of the liquid precursors of an upper liquid precursor layer and a lower, adjacent liquid precursor layer within a stack of precursor layers preferably is between 0.1 and 10 and more preferably between 0.2 and 7.5. It was found that if such ratio is outside of these preferred ranges the thicknesses of such liquid precursor layers may become non-homogenous in the downstream direction. It was also found that outlet gaps are less sensitive to the viscosity of the precursor layer than substrate gaps. It is, for example, possible to obtain layers with a low thickness of between 30 and 200 µm essentially independently from the viscosity of the precursor to be coated through such outlet gap in a viscosity range of between 2,500 and 15,000 mPas at 25° C. The thickness of the layer coated through such outlet gap is also widely independent from the viscosity of the precursor of the preceding precursor layer.

The downstream speed of the substrate preferably is between 0.05 and 100 m/min, more preferably between 0.5 and 50 m/min and especially preferably between 1.5 and 50 m/min. If the downstream speed of the substrate is less than 0.05 m/min the flow of the liquid precursors towards both a substrate or an outlet gap becomes slow and instable resulting in coating defects. If the downstream speed of the substrate is higher than 100 m/min turbulences might occur at the interfaces between the precursor layers which may, depending on the viscosity and rheology of the precursors, result in uncontrolled mixing and/or coating defects.

It was found by the present inventors that for a specific viscosity of a liquid precursor the quality of the coating may unacceptably deteriorate if the downstream speed of the substrate is selected too high. The deterioration in quality may be reflected in the entrainment of air bubbles or in the occurrence of a streaky and non-uniform coating. The coating speed is preferably adapted so that all liquid precursor layers in a stack of such layers are coated uniformly and with a high quality, i.e. the most speed-sensitive layer determines the overall downstream speed. If the downstream speed of the substrate is selected too low, a reduction of the layer thickness may not be achievable by the reduction of the corresponding gap width only but may also require an increase of the downstream speed. It was furthermore found by the present inventors that the downstream speed of the substrate is preferably selected between the maximum and minimum values specified above. In such downstream speed interval the thickness of the liquid precursor layers is relatively insensitive to variations of the downstream speed so that the thickness of the liquid precursor layer can be majorly regulated by the gap width. It may in particular be necessary to provide a lower gap for a downstream coating knife compared to its adjacent coating knife in the upstream direction, depending on the actual coating thickness provided by the upstream coating knife.

The liquid precursors suitable in the present disclosure comprise a broad range of precursors which can be cured by exposure to actinic radiation and, in particular, to UV-radiation, gamma-radiation and E-beam or by exposure to heat. The liquid precursors are preferably light-transmissive to visible light and UV-light.

Precursors whose curing does not include the release of low molecular weight condensate molecules such as water or alcohol molecules or only includes low amounts of such releases are usually preferred, because the condensate molecules of non-exposed liquid precursor layers can typically not be fully removed from the multilayer film.

The method of forming multilayer films of the present disclosure is highly versatile and allows for the making of a broad range of multilayer films with tailor-made properties.

While the present inventors do not wish to be bound by such considerations, it is speculated that the method of the present disclosure establishes a high quality laminar flow regime which is not accessible by prior art methods.

In contrast to the pre-metered die coating methods for making multilayer films which are disclosed in the prior art, the process of the present disclosure is a self-metered process wherein the flow of the liquid curable precursors mainly results from shear forces. These are provided by the substrate or the layers already attached to it moving in the downstream direction thereby exerting a drag flow onto the respective liquid precursor. Shear forces are also provided by the solid film or films, respectively, if present, moving initially along the upstream side of the coating knife towards the substrate and then, after being deflected at the transversely extending edge of the coating knife, parallel to the substrate in the downstream direction. It is believed that the volume flow resulting from these shear forces both in substrate gaps and in outlet gaps, respectively, is essentially laminar and stable and that any turbulences which might occur, for example, when forming the liquid precursor layers at the respective gaps, are effectively dampened by essentially simultaneous applying the liquid precursor layers and, optionally, the solid film or films onto each other. The essentially simultaneous application of an upper adjacent liquid precursor onto a lower liquid precursor layer is preferably provided by arranging the coating knives appropriately. The essentially simultaneous application of an adjacent upper solid film, if present, is preferably provided by guiding such film along the upstream surface of the coating knife forming the lower precursor layer.

In the pre-metered die coating processes for making multilayer films, the volume flow rate that is provided by the metering pump equals the flow rate that exits the die. Therefore such flow rate is essentially constant independently of the downweb speed of the substrate so that the thickness of a precursor layer coated onto the substrate or a preceding precursor layer, respectively, is essentially inversely proportional to the downweb speed of the substrate. Contrary to that, in the self-metered coating process of the present invention the volume flow rate applied to the web via the respective substrate gap or outlet gap is not constant but varies with the web speed and the wet thickness of a coated precursor layer is mainly influenced by the interactions of the liquid precursor flow with the coating apparatus of the present invention (cf. S. F. Kistler et al., Liquid Film Coating, loc cit., p. 10, bottom of left col. and chapters 12 and 13). In the present invention the volume flow rate tends to increase with increasing web speed so that there is no inverse proportional relationship between the wet film thickness and the downweb speed of the substrate. The self-metered process of the present invention is furthermore characterized by the presence of an excess of the liquid precursors in the respective coating chambers which is metered by the substrate gap or the outlet gap to the moving web. In contrast to that pre-metered die coating processes are characterized by a constant volume flow so that what is conveyed by the pump is also applied to the moving web.

Thus the self-metered process of the present disclosure is fundamentally different from the pre-metered die coating process used in the prior art.

The multilayer films obtainable by the method of the present disclosure preferably exhibit essentially homogenous properties such as, for example, an essentially homogenous thickness of the cured polymer layers in the transverse direction and machine direction. It is speculated by the present inventors that the stable flow pattern established by the shear force regime of the present disclosure results in a flow history of the liquid precursors which is essentially constant over the coating width for all precursors. The average deviation of the thicknesses of the cured layers of the multilayer film in a direction normal to the downstream direction preferably is over an arbitrarily selected distance of 10 mm less than 10%, more preferably less than 5% and especially preferably less than 2.5%. It was found in the present invention that liquid precursor layers with a thickness of less than 300 µm and, in particular, between 20 and 200 lam and more preferably between 50 and 150 µm can preferably be obtained via outlet gaps. The flow of the liquid precursors through such outlet gaps may preferably be supported by applying a solid film along the upstream surface of the downstream coating knife of such gap. The average deviation of the thicknesses of the corresponding cured layers resulting from the above low thickness precursor layers applied via an outlet gap, in a direction normal to the downstream direction preferably is over an arbitrarily selected distance of 10 mm less than 10% and more preferably less than 5%.

In the method of the present disclosure the volume flow, resulting from the shear force regime, is mainly controlled by the gaps between the respective coating knives and the substrate (substrate gap) or between two adjacent coating knives (outlet gap), respectively; the arrangement of the coating knives relative to each other, in particular, in outlet gaps; the geometry of the bottom portion or bottom area of the coating knives used in substrate gaps and outlet gaps, respectively; the speed of the substrate and the viscosity of the curable liquid precursors. These parameters are easy to control and can be varied widely without adversely affecting the stable flow pattern which is essentially laminar and essentially homogenous in the transverse direction. In the process of the present invention, in particular, the gaps between the respective coating knives and the substrate (substrate gaps) can be changed and adjusted in a wide range while the coating process is running. The process of the present disclosure is thus more versatile and easy to handle in comparison to the pre-metered die coating processes for multilayer stacks of wet precursor layers of the state of the art.

The method of the present disclosure provides novel multilayer films with unique properties. While the present inventors do not wish to be bound by such theory it is speculated that this is resulting from a micro-diffusion taking place at the interface between adjacent layers.

The extent of such micro-diffusion is believed to be on the one hand small enough so that it does not affect the integrity of adjacent layers. This can be demonstrated, for example, by adding a dye to one of a pair of adjacent cured layers while not adding a dye to the other cured layer. Cross-sectional microphotographs from such multilayer films preferably show a sharp transition from the dyed layer to the non-dyed layer, and the interface preferably is not blurred.

The extent of such micro-diffusion is believed to be on the other hand large enough to provide a micro-gradient at the interface. The appearance of the interface between two adjacent liquid precursor layers and hence the extent of the micro-diffusion can mainly be influenced by the viscosity of the liquid precursors of the two adjacent precursor layers. The interfacial area between two adjacent precursor layers typically is the more sharp-edged the higher the viscosity of the two liquid precursors. It is believed that interfacial micro-diffusion or micro-mixing can be enhanced by decreasing the Brookfield viscosity of at least one of the precursors of the adjacent layers to less than 5,000 mPa·s, more preferably less than 2,500 mPa·s and especially preferably to from 500-1,500 mPa·s. The interfacial micro-diffusion is believed to be further enhanced when the liquid precursors of both adjacent layers exhibit, independently from each other, a Brookfield viscosity of less than 5,000 mPa·s, more preferably of less than 2,500 mPa·s and especially preferably of between 500-1,500 mPa·s.

The micro-diffusion is also believed to increase the bonding strength between adjacent layers of the multilayer film upon curing which is reflected, for example, in improved mechanical properties such as an increased T-peel strength.

The unique properties of the method of the present disclosure are reflected in the properties of multilayer films obtainable by such method and of assemblies comprising such multilayer films, respectively.

The method of the present invention furthermore allows for the incorporation of solid films such as polymeric films or webs, metal films or webs, woven or non-woven webs, glass fibre reinforced webs, carbon fibre webs, polymer fibre webs or webs comprising endless filaments of glass, polymer, metal, carbon fibres and/or natural fibres. In a coating apparatus containing one or more coating chambers such solid films can be introduced along the upstream surface of the front wall, any intermediate wall and the back wall, respectively.

If the solid film is a release liner, this may be arranged beneath the bottom precursor layer or on top of the top layer of the multilayer film to protect the exposed surfaces of the bottom and top precursor layers, respectively. A release film when included into the multilayer film as an intermediate layer between the bottom and the top polymer layer, respectively, introduces a predetermined breaking surface into the multilayer film. This can be used, for example, to prepare a stack of multilayer films in a single production process from which the individual multilayer films can be easily obtained by peeling along the release surface.

Solid films other than release liners form an integral part of the cured multilayer film. The solid films are also referred to as backing in the cured multilayer film.

In one embodiment, multilayer films of the present disclosure comprise at least two superimposed polymer layers obtainable by the method of the present invention wherein a release liner is applied to the exposed surface of the top layer of the precursor essentially simultaneously with the formation of such layer both in a substrate or outlet gap, respectively. This is preferably achieved by guiding and applying the release liner via the upstream surface of the most downstream coating knife, i.e. the upstream surface of the back wall of the coating apparatus. In an alternative embodiment, the back wall can be provided by the release liner which is suitably tensioned and deflected by rollers, rods, bars, beams or the like to provide a transversely extending edge facing the substrate. In this case the additional back wall can be omitted.

Since the release liner is applied to the exposed surface of the top liquid precursor layer essentially simultaneously with the formation of such layer it is smoothly attached to the top layer in a snug fit without exerting too much pressure or insufficient pressure, respectively, during the application of the liner. Since the liner is arranged in a snug fit the formation of voids between the liner and the surface of the liquid layer is essentially avoided. Likewise, since the release liner is applied along the upstream surface of the coating knife forming the liquid layer the liner is smoothly attached to the surface of the liquid layer essentially without creating turbulences in the liquid layer and the like. Therefore the problems encountered when attaching the liner to the exposed surface of a liquid layer subsequently to the formation of said liquid layer in a die-coating process of the state of the art can be widely avoided or at least diminished in the process according to the present disclosure. This is a unique advantage of the process of the present disclosure which translates into superior properties of multilayer films being obtainable by the method of the present disclosure wherein a release liner is attached to the exposed surface of the top layer of the precursor essentially simultaneously with the formation of said layer and subsequent curing. If desired the release liner can be subsequently removed.

In prior art methods of making multilayer films a release liner, if present, was typically applied to the exposed surface of the top precursor layer subsequent to the formation of such layer. In such methods the release liner was laid upon the exposed top layer using, for example, a guiding roller, bar, rod or beam. Such method requires an exact positioning of the distance between the surface of the substrate and the guiding roller which may be difficult under practical conditions. If the distance is too small then too much pressure is exerted onto the top liquid precursor layer resulting in a distortion of the topmost layer and in the formation of a fluid bead. The fluid bead induces a turbulent flow in the stack of liquid precursor layer so that mixing may occur. If the distance between the guiding roller and the substrate is too large, air-entrapment may occur between the release liner and the exposed surface of the top liquid precursor layer. This results in a poor surface finish of the cured topmost layer of the multilayer film characterized by high $R_z$ values. Also, curing of the topmost surface may be oxygen-sensitive. If the top liquid precursor layer comprises, for example, the precursor of an acrylate based pressure-sensitive adhesive, UV curing of such precursor will be impeded by the presence of oxygen so that an insufficient curing and hence distinctly diminished properties of the pressure-sensitive adhesive layer may occur.

When applying a release liner to the exposed surface of the top precursor layer via an appropriate roller, bar, rod, bead or the like arranged downstream to the downstream surface of the back wall, the exposed surface of the top layer is exposed to the ambient atmosphere in the distance between the back wall and such downstream coating knife which may result in a degradation of the top layer.

It was more specifically found by the present inventors that multilayer films of the present disclosure obtainable by curing a precursor wherein a release liner is applied to the exposed surface of the top layer of the precursor essentially simultaneously with the formation of such top layer with subsequent curing, exhibit advantageous properties in comparison to (i) laminated multilayer films obtained by laminating the corresponding cured precursor layer upon each other;
(ii) multilayer films obtained by the die-coating method of the prior art (disclosed, e.g., in U.S. Pat. No. 4,894,259 of Kuller) where the release liner is attached to the exposed surface of the top layer surface at a position downstream to the most downstream coating knife, i.e. in an open face distance;

(iii) multilayer films obtained where the release liner is attached to the exposed surface of the top layer surface at a position downstream to the most downstream coating knife, i.e. in an open face distance; and (iv) multilayer films obtained by applying one or more liquid precursor layers to one or more cured precursor films or one or more laminates of such precursor films with subsequent curing, irrespective of whether the release liner (if applied) was attached via the upstream surface of the back wall or an additional downstream coating knife.

These advantages apply irrespective of whether the top liquid precursor layer was formed via a substrate gap or an outlet gap, respectively. In particular, the formation of thin and uniform layers is difficult or even impossible with these methods, besides the further advantages of the present invention like higher T-peel strength between the layers due to the inventive production method.

The liquid precursors suitable in the present disclosure preferably comprise at least one compound having a radiation curable ethylene group. In a preferred embodiment, the radiation curable ethylene group is a (meth)acrylate group. In another preferred embodiment, the radiation curable ethylene group is a mono- and/or poly(meth)acrylate functional oligomer compound comprising at least one urethane bond. The term "oligomer" as used above and below refers to relatively low molecular weight polymeric compounds. Poly(meth)acrylate functional oligomer compounds comprising at least one urethane bond preferably have a weight average molecular weight $M_w$ between 500 and 35,000 and more preferably of between 1,000 and 30,000. Such oligomeric compounds are typically liquid at room temperature and ambient pressure whereby the Brookfield viscosity is preferably less than 500 Pa·s and more preferably less than 200 Pa·s at 25° C.

The liquid precursor of the present disclosure preferably is essentially solvent-free, i.e. it does essentially not comprise any non-reactive solvents such as, for example, methanol, acetone, dimethylsulfoxide, or toluene. It is, however, possible though not preferred that the precursor comprises small amounts of one or more of such non-reactive solvents of preferably less than 2 parts per hundred (pph) and more preferably of less than 1 pph with respect to the mass of the precursor in order to lower the viscosity of the liquid precursor.

A preferred liquid precursor suitable in the present disclosure is curable to a pressure-sensitive adhesive. Especially preferred is a (meth)acrylate-based pressure-sensitive adhesive.

The liquid precursor of the (meth)acrylate based pressure sensitive adhesive comprises one or more alkyl(meth)acrylates, i.e. one or more (meth)acrylic acid alkyl ester monomers. Useful alkyl(meth)acrylates include linear or branched monofunctional unsaturated (meth)acrylates of non-tertiary alkyl alcohols, the alkyl groups of which have from 4 to 14 and, in particular, from 4 to 12 carbon atoms. Examples of these lower alkyl acrylates which are useful in the liquid precursor of (meth)acrylate based adhesives include n-butyl, n-pentyl, n-hexyl, cyclohexyl, isoheptyl, n-nonyl, n-decyl, isohexyl, isobornyl, 2-ethyloctyl, isooctyl, 2-ethylhexyl, tetrahydrofurfuryl, ethoxyethoxyethyl, phenoxyethyl, cyclic trimethlypropane formal, 3,3,5-trimethylcyclohexyl, t-butylcyclohexyl, t-butyl acrylates and methacrylates. Preferred alkyl acrylates include isooctyl acrylate, 2-ethylhexyl acrylate, n-butylacrylate, tetrahydrofurfuryl acrylate, isobornyl acrylate, ethoxyethoxyethyl acrylate, phenoxyethyl acrylate, 3,3,5-trimethylcyclohexyl acrylate, and cyclohexyl acrylate.

Particularly preferred alkyl acrylates include isooctyl acrylate and tetrahydrofurfuryl acrylate. Particularly preferred alkyl methacrylates include butyl methacrylate, cyclohexyl methacrylate, and isobornyl methacrylate.

The liquid precursor of the (meth)acrylate based pressure sensitive adhesive preferably comprises up to 5 and, in particular, 1-4 (meth)alkyl acrylates. The amount of the alkyl acrylate compounds with respect the total mass of (meth)acrylate functionalized monomers, oligomers and/or polymers with the exception of crosslinkers preferably is at least 75 wt. %, more preferably at least 85 wt. % and especially preferably between 85 and 99 wt. %.

The liquid precursor of the (meth)acrylate based pressure sensitive adhesive may furthermore comprise one or more moderately polar and/or strongly polar monomers. Polarity (i.e., hydrogen-bonding ability) is frequently described by the use of terms such as 'strongly', 'moderately', and 'poorly'. References describing these and other solubility terms include 'Solvents', Paint Testing Manual, 3rd ed., G. G. Seward, Ed., American Society for Testing and Materials, Philadelphia, Pa., and 'A ThreeDimensional Approach to Solubility', Journal of Paint Technology, Vol. 38, No. 496, pp. 269-280. Examples for strongly polar monomers are acrylic acid, methacrylic acid, itaconic acid, hydroxyalkyl acrylates, acrylamides and substituted acrylamides while, for example N-vinyl pyrrolidone, N-vinyl caprolactam, acrylonitrile, vinylchloride, diallyl phthalate and N,N-dialkylamino(meth)acrylates are typical examples of moderately polar monomers. Further examples for polar monomers include cyano acrylate, fumaric acid, crotonic acid, citronic acid, maleic acid, β-carboxyethyl acrylate or sulfoethyl methacrylate. The alkyl(meth)acrylate monomers enumerated above are typical examples of relatively poorly polar monomers. The amount of more moderately polar and/or strongly polar monomers preferably is not too high and, in particular, does not exceed 25 wt. % with respect to the total mass of (meth)acrylate functionalized monomers, oligomers and/or polymers with the exception of crosslinkers.

The liquid precursor of the (meth)acrylate based pressure sensitive adhesive may furthermore comprise one or more monomers like mono- or multifunctional silicone (meth) acrylates. Exemplary silicone acrylates are TEGO RAD products from the Evonik Company, Germany, methacryyloxyurea siloxanes or acrylamidoamido siloxanes.

Ethylenically unsaturated partly- or perfluorinated mono- or oligomers may also be part of the formulation of the liquid precursor. Examples are the perfluoropolyether acrylate Sartomer CN 4001, available from Sartomer Company Inc, or the F-oligomer II, synthesized as detailed I the "List of materials used" below.

The liquid precursor of the (meth)acrylate based pressure sensitive adhesive preferably comprises one or more crosslinkers in an amount effective to optimize the cohesive or inner strength of the cured pressure sensitive adhesive. Useful crosslinkers for use in the liquid precursor of the (meth)acrylate based pressure sensitive include, for example, benzaldehyde, acetaldehyde, anthraquinone, various benzophenone-type and vinyl-halomethyl-s-triazine type compounds such as, for example, 2,4-bis(trichloromethyl)-6-(4-methoxyphenyl)-s-triazine. Preferred are polyacrylic-functional monomers such as, for example, trimethylolpropane triacrylate, pentaerythritol tetraacrylate, 1,2-ethylene glycol diacrylate, tripropyleneglycol diacrylate, 1,6-hexanediol diacrylate or 1,12-dodecanediol diacrylate. The compounds listed above, which can be substituted or unsubstituted, are intended to be illustrative and by no means limitative. Other useful crosslinkers which could be used are thermal crosslinkers. Exemplary thermal crosslinkers include: melamine, multifunctional aziridiens, multifunctional isocyanates, dicarbonic acids/carbonic acid anhydides, oxazoles, metalchelates, amines, carbodiimides, oxazolidones, and epoxy compounds. Hydroxyfunctional acrylates such as 4-hydroxybutyl(meth)acrylate or hydroxyethyl(meth)acrylate can be crosslinked, for example, with isocyanate or amine compounds.

Hydrolyzable, free-radically copolymerizable crosslinkers, such as monoethylenically unsaturated mono, di- and trialkoxy silane compounds including, but not limited to, methacryloxypropyltrimethoxysilane, vinyldimethylethoxysilane, vinylmethyldiethoxysilane, vinyltriethoxysilane, vinyltrimethoxysilane, vinyltriphenoxysilane, and the like are also useful crosslinking agents.

Aside from thermal, moisture or photosensitive crosslinking agents, crosslinking may achieve using high energy electromagnetic radiation such as gamma or e-beam radiation.

The crosslinking compounds are preferably present in an amount of 0.01 to 10 pph, in particular, between 0.01 and 5 pph and very specifically between 0.01 and 3 pph.

The liquid precursor of the (meth)acrylate based pressure sensitive adhesive preferably comprises one or more photoactivatable polymerization initiators such as, for example, benzoin ethers (e.g., benzoin methyl ether, benzoin isopropyl ether, substituted benzoin ethers such as anisoin methyl ether), acetophenones (e.g., 2,2-diethoxyacetophenone), substituted acetophenones such as 2,2-diethoxyacetophenone, 2,2-dimethoxy-2-phenyl-acetophenone, and 1-phenyl-2-hydroxy-2-methyl-1-propanone, substituted alpha-ketols (e.g., 2-methyl-2-hydroxy-propiophenone), aromatic sulphonyl chloride, and photoactive oximes such as 1-phenyl-1,1-propanedione-2-(0-ethoxycarbonyl) oxime and/or thermally activatable initiators such as, for example, organic peroxides (e.g., benzoyl peroxide and lauryl peroxide) and 2,2'-azobis(isobutyronitrile). The liquid precursor preferably comprises between 1-3 and, in particular, between 1-2 photoinitiator compounds; especially preferred are liquid precursors comprising only one photoinitiator compound. The photoinitiator compounds are preferably present in an amount of 0.01-2.00 pph, in particular, between 0.05-1.00 pph and very specifically between 0.1-0.5 pph.

The liquid precursor of the (meth)acrylate based pressure sensitive adhesive may comprise other components and adjuvents such as tackifiers, plasticizers, reinforcing agents, dyes, pigments, light stabilizing additives, antioxidants, fibers, electrically and/or thermally conducting particles, fire retardants, surface additives (flow additives), rheology additives, nanoparticles, degassing additives, hollow glass microspheres, expandable or pre-expanded polymeric microspheres comprising a polymeric shell encapsulating a gaseous atmosphere, hydrophobic or hydrophilic silica, calcium carbonate, blowing agents, gas bubbles (e.g. $N_2$) reinforcing and toughening agents. As was discussed above, the liquid precursor of at least one of the exposed layers of the stack of precursor layers comprising two or more layers and the corresponding multilayer film, respectively, are preferably free of cavities provided by blowing agents, gas bubbles (e.g. $N_2$), hollow glass microspheres or expandable or pre-expanded polymeric microspheres comprising a polymeric shell encapsulating a gaseous atmosphere, and/or free of fibers such as such as natural fibers, polymers fibers, carbon fibers or endless filaments of glass, polymer or metal, fiber pulps and the like. In such construction the exposed layers free of cavities and/or fibers preferably have a thickness of between 20 and 200 µm and more preferably if between 30 and 150 µm. Especially preferred are stacks of precursor layers or of the resulting multilayer films, respectively, having 3 or more layers wherein at least one of the exposed layers is essentially free of cavities and/or fibers and has a thickness of between 20 and 200 µm and more preferably if between 30 and 150 µm.

The liquid precursor of the (meth)acrylate based pressure sensitive adhesive is preferably prepared by adding part of the photoinitiator compounds to a monomer mixture comprising the alkyl(meth)acrylate monomers and the moderately polar and/or strongly polar monomers and partially polymerizing such mixture to a syrup of a coatable viscosity of, for example, 300-35,000 mPa·s (Brookfield, 25° C.). The viscosity of the resulting precursor is further adjusted by adding the other compounds such as crosslinker compounds, the remainder of the photoinitiator compounds, silicone (meth)acrylates and any additives and adjuvants as may be used. The viscosity of the resulting precursor can also be adjusted by adding a small amount of typically less than 5 pph of a polymeric additive such as, for example, reactive, photopolymerizable polyacrylates. The partial polymerization of the monomer mixture is preferably carried out with appropriate UV lamps having at a wavelength between 300-400 nm with a maximum at 351 nm at an intensity of preferably between about 0.1 to about 25 mW/cm$^2$. The exposure preferably is between 900-1,500 mJ/cm$^2$. The polymerization may be stopped either by removal of the UV and/or the introduction of, for example, radical scavenging oxygen. An example of a suitable UV-curing station is described in connection with the coating apparatus described in the Examples below.

Another preferred liquid precursor suitable in the present disclosure is UV-curable and comprises at least one ethylenically unsaturated compound comprising at least one urethane bond. Such compounds preferably are monomers or oligomers, and/or at least one of the ethylenically unsaturated groups preferably is a (meth)acrylate group. Such precursor can be polymerized to a polyurethane acrylate polymer, i.e. to a polymer comprising urethane bonds. Especially preferred is a liquid precursor comprising one or more mono- and/or multi(meth)acrylate functional monomer or oligomer compounds comprising at least one urethane bond, one or more monomer compounds comprising one or more ethylenically unsaturated groups but no urethane bond and one or more photoinitiators.

Mono- and multi-(meth)acrylate functional oligomers comprising at least one urethane bond are commercially available, for example, from Rahn A G, Zurich, Switzerland under the GENOMER trade designation. GENOMER 4188 is a mixture consisting of 80 wt. % of a monoacrylate-functional polyester based oligomer comprising at least one urethane bond, and 20 wt. % of 2-ethylhexyl-acrylate; the oligomer comprised by GENOMER 4188 has a weight average molecular weight $M_w$ of about 8,000 and the average acrylate functionality is 1±0.1. GENOMER 4316 is an aliphatic trifunctional polyurethane acrylate characterized by a viscosity of 58,000 mPas at 25° C. and a glass transition temperature $T_g$ 4° C. GENOMER 4312 is an aliphatic trifunctional polyester urethane acrylate characterized by a viscosity of 50,000-70,000 mPas at 25° C.

The mono- or multi-(meth)acrylate functional oligomer compounds each have at least one, preferably at least 2 and more preferably at least 4 urethane bonds.

Mono- and multi-(meth)acrylate functional oligomers and their preparation are disclosed on p. 4, ln. 24-p. 12, ln. 15 of WO2004/000,961 which passage is herewith incorporated by reference.

The amount of the one ore more mono- or multi-(meth) acrylate functional oligomers comprising at least one urethane bond with respect to the total mass of meth)acrylate functionalized monomers, oligomers and/or polymers with the exception of crosslinkers preferably is from 30-97.5 wt. % and more preferably from 45-95 wt. %.

The liquid precursor of the polyurethane polymer suitable in the present disclosure furthermore preferably comprises one or more monomer compounds comprising one or more ethylenically unsaturated group but no urethane bond. Examples of suitable ethylenically unsaturated groups include vinyl, vinylene, allyl and, in particular, (meth) acrylic groups. The amount of such compounds with one or more ethylenically unsaturated group total mass of meth)acrylate functionalized monomers, oligomers and/or polymers with the exception of crosslinkers preferably is from 2.5-70 wt. % and more preferably from 5-55 wt. %.

Compounds with one or more (meth)acrylic groups can preferably be selected from the poorly polar alkyl(meth) acrylate monomers, the moderately polar and/or strongly polar monomers and the two- or higher acrylic group functional crosslinkers disclosed above in connection with the liquid precursor of the acrylate-based pressure-sensitive adhesive.

The liquid precursor of the polyurethane polymer preferably comprises one or more (meth)acrylate monofunctional compounds having a glass transition temperature of the corresponding homopolymer of less than 10° C. Preferred examples of such monomers include n-butyl acrylate, isobutyl acrylate, hexyl acrylate, 2-ethylhexyl acrylate, isooctyl acrylate, caprolactone acrylate, isodecyl acrylate, tridecyl acrylate, lauryl methacrylate, methoxy-polyethylenglycol-monomethacrylate, lauryl acrylate, tetrahydrofurfuryl acrylate, ethoxy-ethoxyethyl acrylate and ethoxylated-nonyl acrylate. Especially preferred are 2-ethylhexyl acrylate, isooctyl acrylate and tetrahydrofurfuryl acrylate.

The liquid precursor of the polyurethane polymer preferably comprises one or more (meth)acrylate monofunctional compounds having a glass transition temperature of the corresponding homopolymer of 50° C. or more. Preferred examples of such monomers include acrylic acid, N-vinylpyrrolidone, N-vinyl caprolactam, isobornyl acrylate, acryloylmorpholine, isobornyl methacrylate, phenoxyethyl acrylate, phenoxyethyl methacrylate, methylmethacrylate and acrylamide. Especially preferred areacrylic acid, isobornyl acrylate and N-vinyl caprolactam.

Examples of compounds with two or more ethylenically unsaturated groups which are suitable in the curable liquid precursor of the polymer comprised in the layer or layers of the multilayer film of the present disclosure include $C_2$-$C_{12}$ hydrocarbondiol diacrylates such as 1,6-hexanediol diacrylate, $C_4$-$C_{14}$ hydrocarbon divinylethers such as hexanediol divinylether and $C_3$-$C_{12}$ hydrocarbontriol triacrylates such as trimethylolpropanetriacrylate. Two or higher acrylate functional monomers and, in particular, two- or three acrylate-functional monomers are preferred.

The liquid precursors described above are to exemplify the present disclosure without limiting it.

In FIG. 1, a coating apparatus 1 is shown with which the inventive method is carried out. The coating apparatus 1 comprises three coating knives 2, 3, 4, which are offset from a substrate 5 in the form of a (bottom) release liner, thus forming substrate gaps 9 between the respective bottom portions of the coating knives 2, 3, 4 and the substrate 5. The coating knife 3 exhibits in its bottom area an increased width in the downstream direction in the form of a ramp-like bulge 15 protruding from its downstream surface. An outlet gap 10 is formed between adjacent coating knives 3 and 4 in the area of the protruding bulge 15 at the outlet of coating chamber 8 formed between coating knives 3 and 4. The substrate gaps 9 formed between coating knives 2, 3 and 4, respectively, and the substrate 5 are essentially normal to the substrate whereas outlet gap 10 is essentially parallel to the substrate 5 and the flow direction 6.

The substrate 5 is moved relatively to the coating apparatus 1 in a downstream direction 6 as indicated by an arrow. The coating knives 2, 3, 4 are vertically arranged, spaced apart and held independently from each other and can be moved in a vertical direction to change the width of the substrate gaps 9 to the substrate 5. The coating knives 2, 3, 4 can further be moved relatively to each other in a lateral direction in order to modify the lateral distance between the coating knives 2, 3, 4.

The lateral spaces between adjacent coating knives 2, 3, 4 define coating chambers 7, 8, in which liquid precursors II, III are provided under ambient pressure. The front wall and the back wall of each coating chamber 7, 8 is defined by coating knives 2, 3 and 4, respectively. A third liquid precursor I is provided in front of the most upstream coating knife 2 as a rolling bead. The coating apparatus of FIG. 1 provides a precursor of the multilayer film comprising three precursor layers 12, 13, 14 arranged in a stack of superimposed layers. The coating apparatus is particularly useful for providing a 3-layer precursor of a multilayer film wherein the top and bottom layers 12, 14 are thinner than the middle layer 13. In a preferred embodiment described in the Example section below the liquid precursors I, III provided at the most upstream and downstream position, respectively, are identical or different liquid precursors of a non-foamed acrylic pressure sensitive adhesive formulation. The liquid precursor II provided in the coating chamber 7 is an acrylic foam formulation, e.g. an acrylic precursor filled with hollow glass microspheres. The resulting 3-layer precursor comprises non-foamed pressure-sensitive adhesive skin layers 12, 14 and an acrylic foam middle layer 13.

In the most downstream coating chamber 8, a solid film 11 (in the Examples and Comparative Examples a release liner with a thickness of 75 μm) is applied along the upstream surface of the downstream knife 4 of the two adjacent coating knives 3, 4 essentially simultaneously with the curable liquid precursor III.

By moving the substrate 5 relatively to the coating apparatus 1 in the downstream direction 6, the liquid precursors I, II, III are deposited onto the substrate 5 in a self-metered manner and superimposed on one another in the order of the arrangement of the liquid precursors I, II, III to form the precursor layers 12, 13, 14. The thickness of the bottom precursor layer 12 can be adjusted by the substrate gap 9 between the most upstream coating knife 2 and the substrate 5. The thickness of the following precursor layer 13 does not only depend on the substrate gap 9 between the respective coating knife 3 and the substrate 5, but also on the thickness of the bottom precursor layer 12. Accordingly, the vertical position of the coating knife 3 is adjusted in such a way that the desired thickness of the precursor layer 13 is achieved. The thickness of precursor layer 14 is mainly controlled by adjusting the width of outlet gap 10 whereas the width of the substrate gap 9 between the bottom edge of knife 4 and substrate 5 which is adjacent to gap 10 in the downstream direction, mainly controls the total thickness of the stack of precursor layers 12, 13, 14.

The stack of precursor layers is afterwards lead through a UV-curing station having a length of 3 m in the Examples and Comparative Examples below and cured. Thus, a triple multilayer film is formed which in a preferred embodiment described in the Example section below is a double sided adhesive tape formed with a skin-foam-skin arrangement. Curing is effected both from the top, i.e. in a direction towards the exposed liquid precursor layer covered with a release liner and from the bottom, i.e. in a direction towards the substrate whereby the intensities provided in both directions are set at equal levels. In the Examples and Comparative Examples below the radiation was provided by fluorescent lamps at a wavelength between 300-400 nm with a maximum at 351 nm. The total radiation intensity irradiated cumulatively from top and bottom and the respective length of the two coating zones is as follows:

|  | Zone 1 (length 200 cm) | Zone 2 (length 100 cm) |
|---|---|---|
| Total intensity (mW/cm$^2$) | 2.07 | 4.27 |

Figure 2:
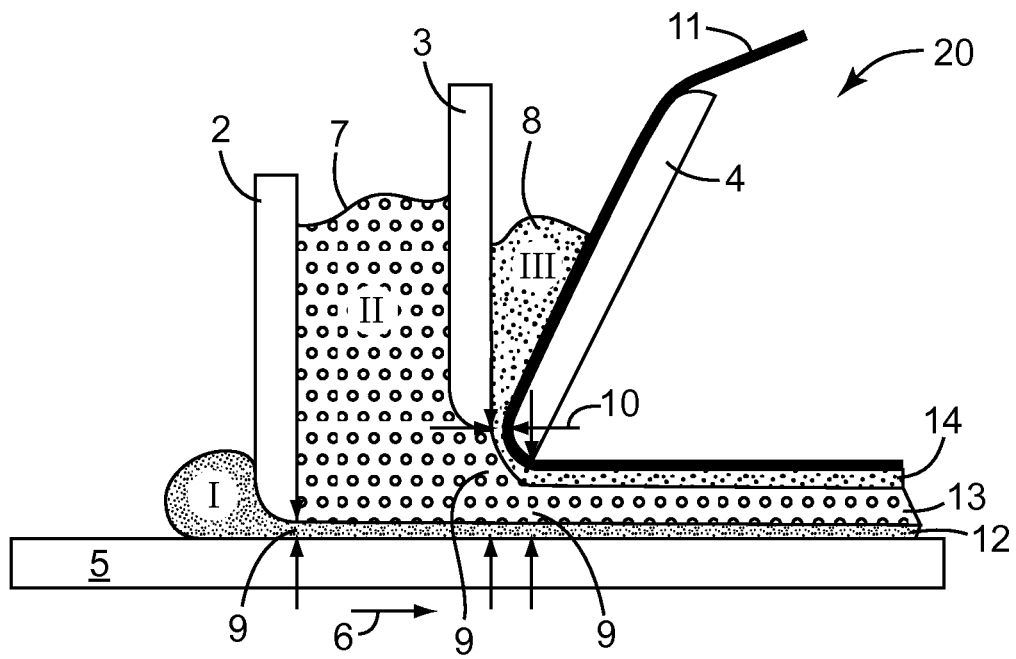
FIG. 2, which is a schematic representation of a coating apparatus to carry out a second embodiment of the inventive method.

FIG. 2 is a schematic representation of another embodiment of a coating apparatus 20 suitable in the present invention which differs from the coating apparatus of FIG. 1 in that the outlet gap 10 is formed by providing a skewed arrangement of adjacent coating knives 3, 4.

Figure 3:
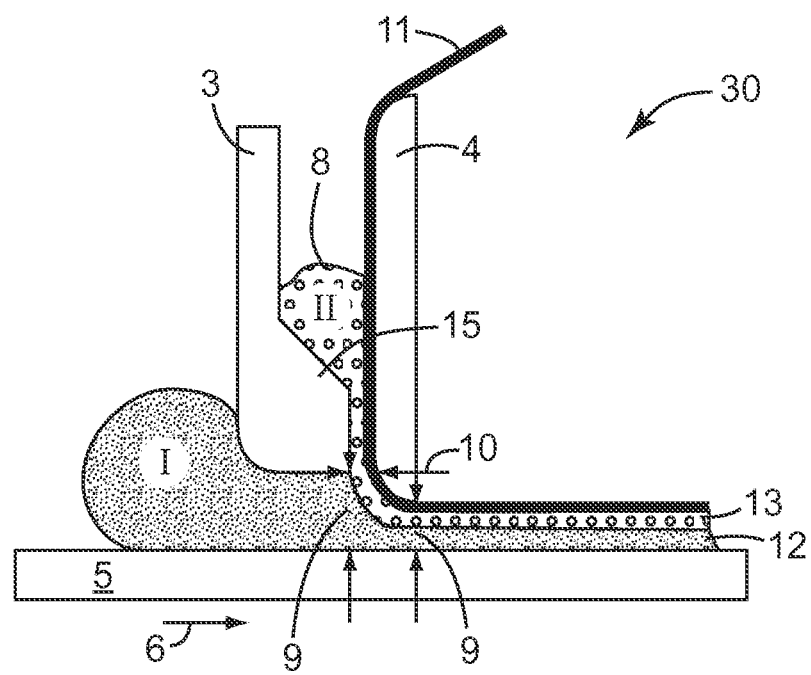
FIG. 3, which is a schematic representation of a coating apparatus to carry out a third embodiment of the inventive method.

FIG. 3 is a schematic representation of another embodiment of a coating apparatus 30 suitable in the present invention which differs from the coating apparatus of FIG. 1 in that the first coating knife 2 and thus the first coating chamber 7 is missing. Such an arrangement allows the production of dual layer multilayer films.

Figure 4:
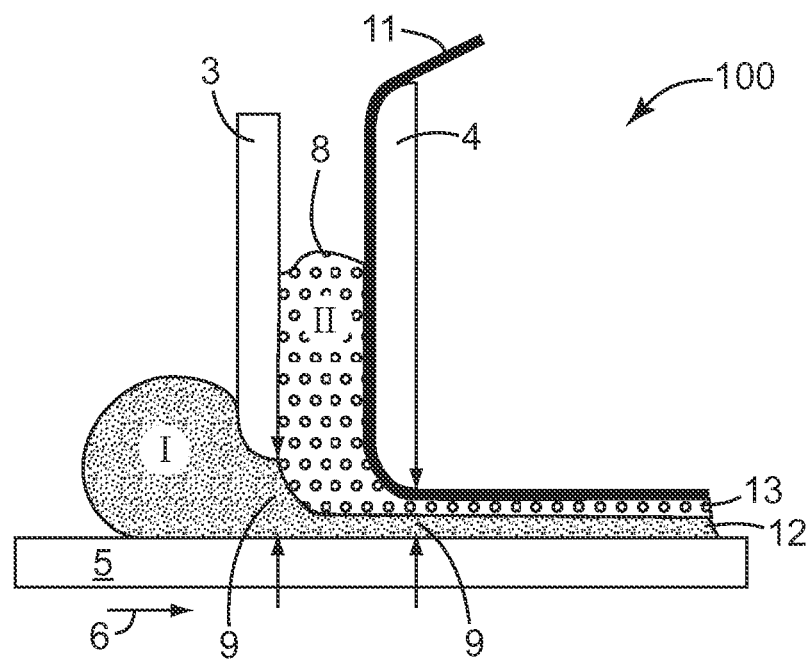
FIG. 4, which is a schematic representation of a coating apparatus to carry out comparative tests.

FIG. 4 is a schematic representation of a coating apparatus 100 disclosed in Applicant's co-pending patent application PCT/US2011/022685. The coating apparatus 40 of FIG. 4 comprises two coating knives 3, 4 arranged to exhibit two substrate gaps 9 between the coating knives 3, 4 and the substrate 5 which are arranged essentially normal to the substrate. The coating apparatus of FIG. 4 does not exhibit an outlet gap 10. In the Example section below the coating apparatus of FIG. 3 is used to compare the method of the present invention and the resulting multilayer films with the prior art method of FIG. 4 and the resulting multilayer films using identical precursors in order to show that the outlet gap 10 of the present invention allows to obtain thinner precursor layers on already existing precursor layers in comparison to the prior art method.

Figure 5:
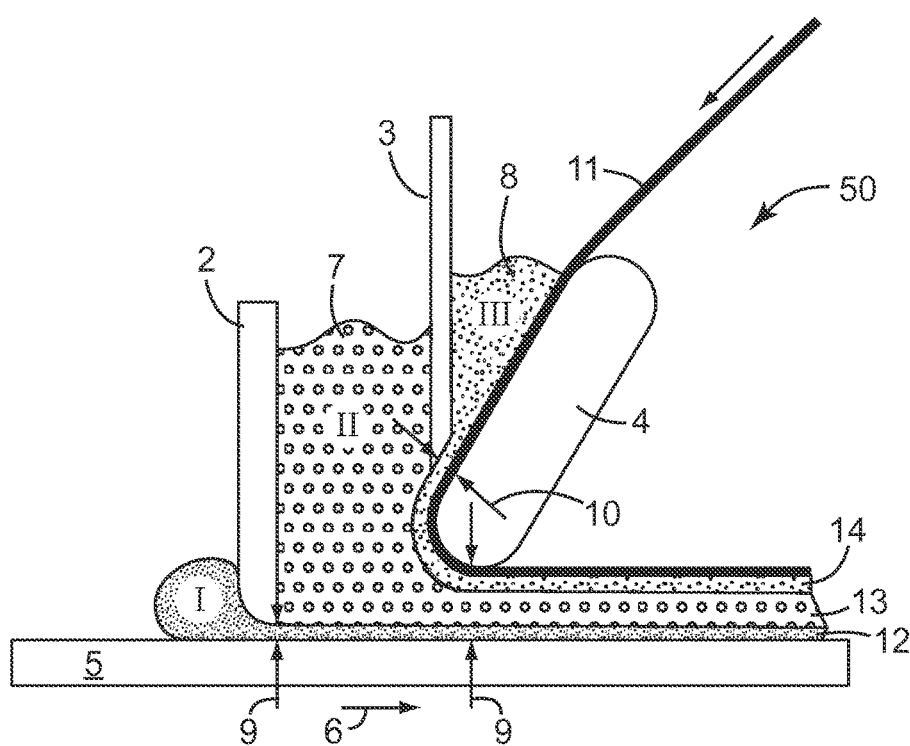
FIGS. 5 and 5A, which are schematic representations of two coating apparatuses to carry out a third embodiment of the inventive method.

FIG. 5 is a schematic representation of another embodiment of a coating apparatus 50 suitable in the present invention which differs from the coating apparatus of FIG. 1 that the horizontal gap 10 is formed between a pair of adjacent coating gaps 3, 4. Coating knife 3 has a plate-like shaped with an essentially rectangular cross-section which is arranged essentially normal to the substrate 5. The bottom surface of coating knife 3 is skewed and faces the up-stream surface of coating knife 4 to form a coating gap 10. Coating knife 4 has a rectangular cross-section with rounded top and bottom edges, respectively, to allow for application of release liner 11 along the upstream surface of coating knife 4. Coating knife 4 is arranged under a skewed angle relative to substrate 5.

Figure 5A:
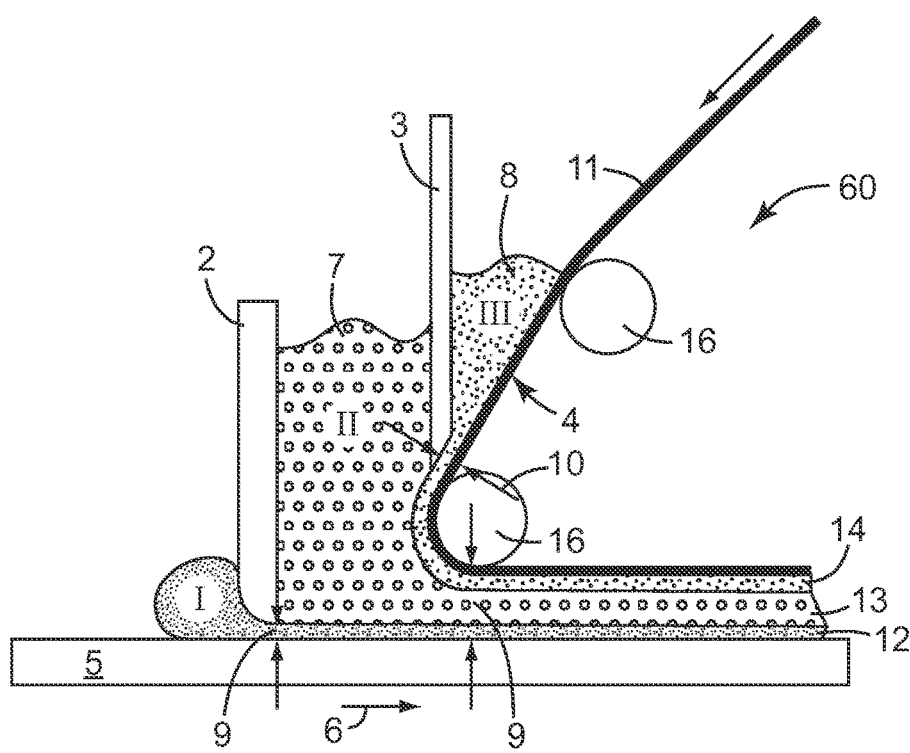
Figures 6A, 6B, 6C:
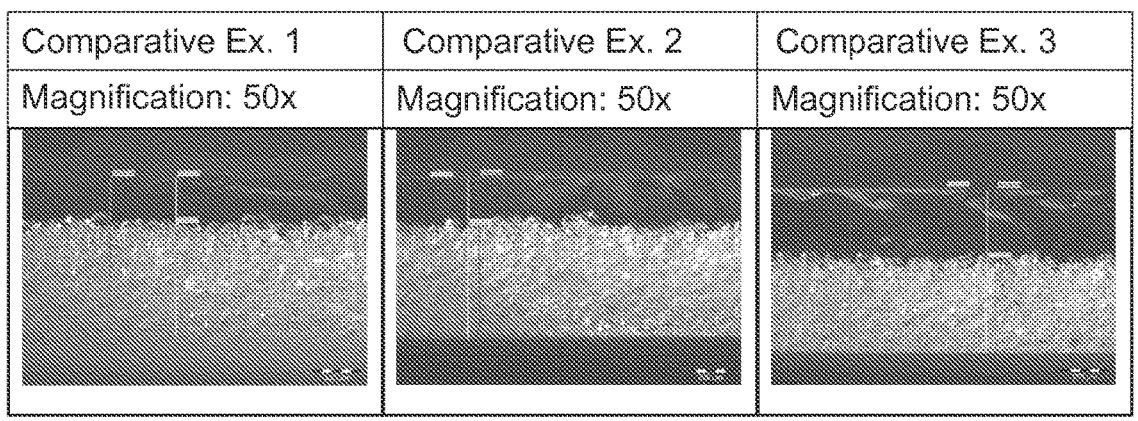
FIGS. 6a-6g, which are micro-photographical cross-sectional views of dual and triple layer films, respectively, obtained in the Examples and the Comparative Examples, respectively.
Figures 6D, 6E, 6F:
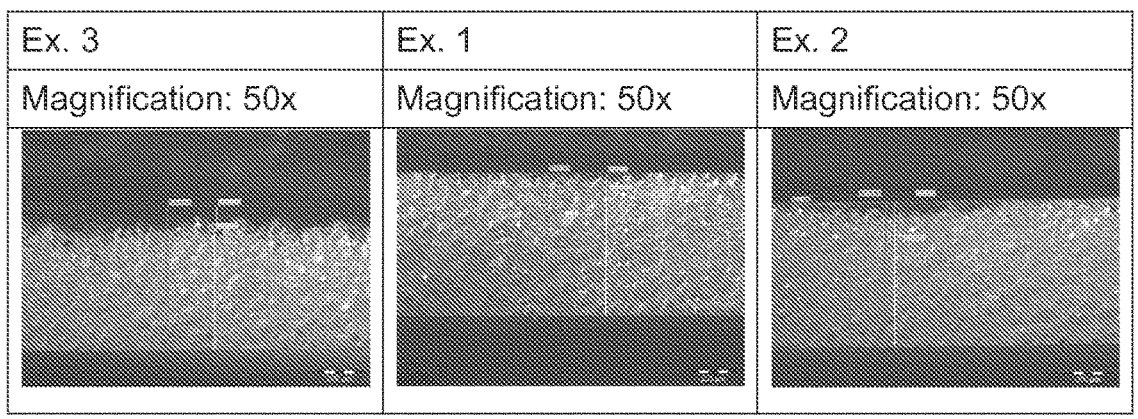
Figure 6G:
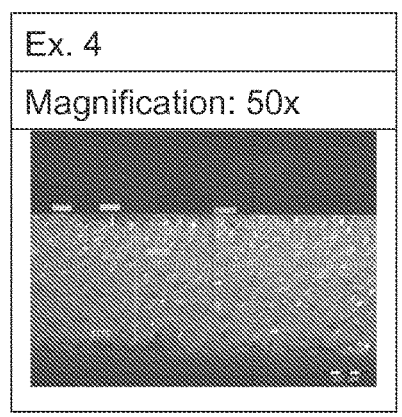

FIG. 5A is a schematic representation of another embodiment of a coating apparatus 60 suitable in the present invention which differs from the coating apparatus of FIG. 5 in that coating knife 4 is provided by release liner 11 guided over rollers 16.

FIGS. 6a-g are cross-sectional photographs of the materials obtained in Examples 1-4 and Comparative Examples 1-3, respectively, obtained in the below Example section.

Item 1 is a continuous self-metered process of forming a multilayer film comprising at least two superimposed polymer layers comprising the steps of:

(i) providing a substrate (5);

(ii) providing two or more coating knives (2, 3, 4) which are offset, independently from each other, from said substrate (5) and/or from an adjacent coating knife to form at least one substrate gap (9) relative to the surface of the substrate (5) and at least one outlet gap (10) relative to the surface of an adjacent coating knife;

(iii) moving the substrate (5) relative to the coating knives (2, 3, 4) in a downstream direction (6), (iv) providing curable liquid precursors of the polymers (I, II, III) to the upstream side of the coating knives (2, 3, 4) thereby coating the two or more precursors (I, II, III) through the respective gaps (9, 10) as superimposed layers (12, 13, 14) onto the substrate (5);

(v) optionally providing one or more solid films (11) and applying these essentially simultaneously with the formation of the adjacent lower polymer layer, and (vi) curing the precursor of the multilayer film thus obtained;

wherein a lower layer of a curable liquid precursor (I, II, III) is covered by an adjacent upper layer of a curable liquid precursor (I, II, III) or a film (11), respectively, essentially without exposing said lower layer of a curable liquid precursor (I, II, III).

Item 2 is the process of item 1, wherein the width of the one or more outlet gaps (10) formed between the surfaces of adjacent coating knifes (2, 3, 4) is independently from each other between 50 μm and 1,500 μm and preferably between 100 and 1,000 μm.

Item 3 is the process according to any of item 1 or 2, wherein the cross-sectional profile of at least one of the coating knives (2, 3, 4) at its transversely extending bottom edge facing the web is essentially planar, curved, concave or convex.

Item 4 is the process according to any of the preceding items, wherein the one or more outlet gaps (10) formed between the surfaces of adjacent coating knifes (2, 3, 4) is essentially arranged at the outlet of the coating chamber (7, 8) formed between such adjacent coating knives (2, 3, 4).

Item 5 is the process according to item 4, wherein the adjacent coating knives (2, 3, 4) exhibit a skewed arrangement relative to each other thereby forming an outlet gap (10) between them.

Item 6 is the process according to item 4, wherein the width of at least one of the adjacent coating knives (2, 3, 4) along its height is larger in the bottom area of such coating knife relative to the width of such coating knife outside of such area.

Item 7 is the process according to any of the preceding items, wherein the top layer (14) of the stack of superimposed precursor layers (12, 13, 14) is formed by an outlet gap (10) and optionally a substrate gap (9).

Item 8 is the process according to any of the preceding items, wherein a solid film (11) is applied through an outlet gap (10) formed between two adjacent coating knives (2, 3, 4) whereby said solid film (11) forms the downstream coating knife of the outlet gap (10) or is applied via the upstream surface of the downstream coating knife of such gap (10), respectively.

Item 9 is the process according to any of the preceding items, wherein a release liner (11) is attached in step (v) to the exposed surface of the top layer of the precursor of the multilayer film essentially simultaneously with the formation of such top layer.

Item 10 is the process according to any of the preceding items, wherein the liquid precursors are each applied independently from each other under ambient pressure or an over-pressure, respectively.

Item 11 is the process according to any of the preceding items, wherein the liquid precursors of the polymer material are provided in one or more coating chambers (7, 8) essentially abutting each other and being bordered in downstream direction by a front wall, optionally one or more intermediate walls and a back wall, and, optionally, by a rolling bead positioned up-web relative to the front wall, whereas in particular the upstream intermediate walls, the back wall and, if a rolling bead is present upstream relative to the front wall, the front wall are formed by coating knives (2, 3, 4).

Item 12 is the process according to any of the preceding items, wherein the substrate (5) and/or the solid film (11) are selected from a group of materials comprising polymeric films or webs, metal films or webs, woven or non-woven webs, glass fiber reinforced webs, carbon fiber webs, polymer fiber webs or webs comprising endless filaments of glass, polymer, metal, carbon fibers and/or natural fibers.

Item 13 is the process according to any of the preceding items, wherein the precursor layers are cured thermally and/or by exposing them to actinic radiation after they have passed the back wall of a coating apparatus (1, 20, 30, 50, 60).

Item 14 is the process according to item 13, wherein at least one of the precursors comprises at least one compound having a radiation curable ethylene group.

Item 15 is the process according to any of the preceding items, wherein the precursors of the bottom and/or top layers are substantially free of gas cavities in the form of gas inclusions resulting from stirring in gas bubbles for from blowing agents, hollow polymeric or inorganic microspheres or expandable polymeric microspheres comprising an expandable polymer shell enclosing a gaseous atmosphere.

Item 16 is the process according to any of the preceding items wherein the precursors of the multilayer film comprises at least 3 layers wherein at least one intermediate layers comprises a foam material comprising gas cavities in the form of gas inclusions resulting from stirring in gas bubbles or from blowing agents, hollow polymeric or inorganic microspheres or expandable polymeric microspheres comprising an expandable polymer shell enclosing a gaseous atmosphere.

Item 17 is the process according to any of the preceding items, wherein the precursor of the multilayer film comprises at least two precursor layers wherein at least one exposed layer is applied via an outlet gap (10) and has a thickness between 30 to 200 μm, in particular of 50 to 150 μm.

Item 18 is the process according to item 17, wherein the liquid precursors formed into the exposed layer having a thickness of between 30 to 200 μm, in particular of 50 to 150 μm, has a Brookfield viscosity of between 1,000-20,000 mPas at 25° C.

Item 19 is the process according to any of the preceding items, wherein the precursor of the multilayer film comprises at least three layers wherein at least the top layer is applied via an outlet gap (10) and wherein the top and bottom layer of said film independently from each other comprise each a pressure-sensitive adhesive and exhibit a thickness between 30 to 200 μm, in particular of 50 to 150 μm for each layer.

Item 20 is a multilayer film obtainable by the method according to any of items 1 to 19.

Item 21 is the multilayer film according to item 20, which comprises at least two layers wherein at least one exposed layer has a thickness between 30 to 200 μm, in particular of 50 to 150 μm.

Item 22 is the multilayer film according to item 21, which comprises at least three layers wherein the top layer and the bottom layer of said film independently from each other comprise each a pressure-sensitive adhesive and exhibit a thickness between 30 to 200 μm, in particular of 50 to 150 μm.

Item 23 is the multilayer film according to item 22, wherein the top and bottom layers each have a thickness which is independently from each other at least 50% lower than the thickness of any of the intermediate layer(s).

Item 24 is the multilayer film according to item 23, wherein the top and bottom layer each are substantially free of gas cavities in the form of gas bubbles, (e.g. $N_2$), gas inclusions resulting from blowing agents, hollow polymeric or inorganic microspheres or expandable polymeric microspheres comprising an expandable polymer shell enclosing a gaseous atmosphere. and wherein at least one of the intermediate layer(s) comprises a foam material comprising gas cavities in the form of gas bubbles, (e.g. $N_2$), gas inclusions resulting from stirring in gas bubbles for from blowing agents, hollow polymeric or inorganic microspheres or expandable polymeric microspheres comprising an expandable polymer shell enclosing a gaseous atmosphere.

EXAMPLES

Brookfield Viscosity Test Method

The viscosities of the liquid precursors were measured at 25° C. according to DIN EN ISO 2555:1999 using a Brookfield Digital Viscosimeter DV-II commercially available from Brookfield Engineering Laboratories, Inc.

List of Materials Used

Isooctylacrylate (IOA) is an ester of isooctylalcohol commercially available from Sartomer Company (CRAY VALLEY), France.

Acrylic acid (AA) is commercially available from BASF AG, Germany 2-ethylhexyl acrylate (2-EHA), commercially available from BASF AG, Germany.

1,6-Hexanedioldiacrylate (HDDA) is a fast curing diacrylate monomer which is commercially available form Sartomer (CRAY VALLEY), France.

IRGACURE 651 is 2,2-Dimethoxy-1,2-diphenylethan-1-one is a photoinitiator commercially available by Ciba Speciality Chemicals Inc., USA List of Curable Liquid Precursors Used The list of the used liquid precursors and their formulations are summarized below.

| Precursor | Composition |
| --- | --- |
| I | 90 wt. % of IOA |
| | 10 wt. % of AA |
| | 0.1 wt % HDDA |
| | 0.15 wt % IRGACURE 651 |
| II & III | 92.5 wt. % of IOA |
| | 7.5 wt. % of AA |
| | 0.1 wt % HDDA |
| | 0.2 wt % IRGACURE 651 |
| IV | 90.0 wt. % of 2-EHA |
| | 10.0 wt. % of AA |
| | 0.1 wt % HDDA |
| | 0.20 wt % IRGACURE 651 |

Liquid Precursor I 90 wt. % of isooctyl acrylate and 10 wt. % of acrylic acid were combined with 0.04 wt. % of IRGACURE 651 as a photoinitiator in a glass vessel and stirred for 30 minutes. The mixture was partially polymerized under a nitrogen-rich atmosphere by UV radiation to a degree of polymerization of 5-10% and a Brookfield viscosity of 4,200 mPa·s at 25° C. Subsequent to the curing 0.1 wt % of 1,6-hexanedioldiacrylate as a crosslinker and 0.11 wt. % of Irgacure 651 as a photoinitiator were added and the resulting mixture was thoroughly stirred for 30 minutes to provide liquid precursor I.

Liquid Precursors II and III 92.5 wt. % of isooctyl acrylate and 7.5 wt. % of acrylic acid were combined with 0.4 wt. % of Irgacure 651 as a photoinitiator in a glass vessel and stirred for 30 minutes for liquid precursors II and III. Then the mixtures were partially polymerized under a nitrogen-rich atmosphere by UV radiation to a degree of polymerization of appr. 5-10% and a Brookfield viscosity of 3,000 mPa·s at 25° C. for liquid precursor II and a degree of polymerization of appr. 5-10% and a Brookfield viscosity of 10,300 mPa·s at 25° C. for liquid precursor III. Subsequent to the curing 0.1 wt %. of 1,6-hexanedioldiacrylate as a crosslinker and 0.16 wt. % of Irgacure 651 as a photoinitiator were added and the resulting mixture was thoroughly stirred for 30 minutes to provide liquid precursors II and III, respectively.

Liquid Precursor IV 90 wt. % of 2-EHA and 10 wt. % of acrylic acid were combined with 0.04 wt. % of Irgacure 651 as a photoinitiator in a glass vessel and stirred for 30 minutes. The mixture was partially polymerized under a nitrogen-rich atmosphere by UV radiation to a degree of polymerization of approximately 5-10% and a Brookfield viscosity of 3,100 mPa·s at 25° C. Subsequent to the curing 3 pph of Aerosil 972, 6 pph of glass bubbles, 0.1 wt %. of 1,6-hexanedioldiacrylate as a crosslinker and 0.16 wt. % of Irgacure 651 as a photoinitiator were added and the resulting mixture was thoroughly stirred for 30 minutes to provide liquid precursor IV with a resulting Brookfield viscosity of 9,800 mPa·s.

EXAMPLES

Examples 1 and 2 and Comparative Examples 1-3

A coating apparatus comprising two coating stations formed by a rolling bead and one coating chamber 8 as described above and schematically shown in FIG. 3 was used for Examples 1 and 2. Comparative Examples 1-3 were obtained by using the coating apparatus of FIG. 4 which differs from the coating apparatus of FIG. 3 in that it does not comprise an outlet gap 10. Release liner Hostaphan 2SLK, 75 µm, commercially available from Mitsubishi, was used as a substrate 5 and the downstream speed was set as is indicated below. Another Hostaphan 2SLK, 75 µm release liner 11 was applied to the exposed surface of the upper layer 13 via the upstream surface of coating knife 4 essentially with the formation of layer 13 in outlet gap 10 and the downstream substrate gap in FIG. 3 and in the downstream substrate gap 9 in FIG. 4, respectively. The release liner used as a substrate remained attached to the bottom layer. The width of the coating chamber 8 in downstream direction was 10 mm and the width of the substrate and outlet gaps, respectively, as applicable, are given indicated in the Tables 1 and 2 below.

TABLE 1

| | Ex. 1 and Ex. 2 (Coating apparatus of FIG. 3) | | | | |
| --- | --- | --- | --- | --- | --- |
| | Web speed (m/min) | Liquid precursor in rolling bead | Width of upstream substrate gap 9 (µm) | Liquid precursor in coating chamber 8 | Width of downstream substrate gap 9 (µm) | Width of outlet gap 10 (µm) |
| Ex. 1 | 1.0 | IV | 1000-1010 | II | 800-810 | 290-300 |
| Ex. 2 | | | | III | | |

TABLE 2

| | Comparative Examples 1 to 3 (Coating apparatus of FIG. 4) | | | | |
| --- | --- | --- | --- | --- | --- |
| | Web speed (m/min) | Liquid precursor in rolling bead | Width of upstream substrate gap 9 (µm) | Liquid precursor in coating chamber 8 | Width of downstream substrate gap 9 (µm) |
| Comparative Ex. 1 | 1.0 | IV | 1000-1010 | II | 800-810 |
| Comparative Ex. 2 | | | | I | |
| Comparative Ex. 3 | | | | III | |

Example 3

Example 1 was repeated with the difference that the width of the outlet gap was increased relative to Example 1.

TABLE 3

| | Ex. 3 (Coating apparatus of FIG. 3) | | | | |
| --- | --- | --- | --- | --- | --- |
| | Web speed (m/min) | Liquid precursor in rolling bead | Width of upstream substrate gap 9 (μm) | Liquid precursor in coating Chamber 8 | Width of downstream substrate gap 9 (μm) | Width of outlet gap 10 (μm) |
| Ex. 3 | 1.0 | IV | 1000-1010 | II | 800-810 | 450-470 |

Example 4 (Coating Apparatus of FIG. 1)

A coating apparatus comprising three coating stations formed by a rolling bead and two coating chambers 7, 8 as described above and schematically shown in FIG. 1 was used for Example 4. Release liner Hostaphan 2SLK, 75 μm, commercially available from Mitsubishi was used as a substrate 5 and the downstream speed was set as is indicated below. Another Hostaphan 2SLK, 75 μm release liner 11 was applied to the exposed surface of the upper layer 14 via the upstream surface of coating knife 4 essentially with the formation of layer 14 in outlet gap 10 and the downstream substrate gap 9. The release liner used as a substrate remained attached to the bottom layer. The width of the coating chambers 7 and 8 in downstream direction was 13 mm and 10 mm, respectively. The width of the substrate gaps 9 and the outlet gap 10s, respectively, are given indicated in the Tables 4 below.

TABLE 4

| | Ex. 4 (coating apparatus of FIG. 1) | | | | | | |
| --- | --- | --- | --- | --- | --- | --- | --- |
| | Web speed (m/min) | Liquid precursor in rolling bead | Width of most upstream substrate (μm) | Liquid precursor in coating chamber 7 | Width of intermediate substrate gap 9 (μm) | Liquid precursor in coating chamber 8 | Width of most downstream substrate gap 9 (μm) | Width of outlet gap 10 (μm) |
| Ex. 4 | 1.0 | III | 100-110 | IV | 1000-1010 | I | 800-810 | 290-300 |

In all Examples and Comparative Examples above the width of the most downstream substrate gap 9 formed between coating knife 4 and substrate 5 is smaller than the substrate gap 9 formed between coating knife 3 and the substrate 5 because the thickness of precursor layer 13 formed at the substrate gap 9 formed between coating knife 3 and the substrate is (depending on the viscosity of the respective liquid precursor) only about 50 to 70% of such substrate gap 9.

The stack of the two liquid precursor layers obtained in the Examples and Comparative Examples above was cured in each case between the two release liners by passing it along the UV-curing station described in the coating apparatus above to provide the multilayer film comprising two or three layers, respectively.

Subsequent to curing, the two release liners attached to the exposed surfaces of the multilayer film were removed and the thicknesses of the cured layers were evaluated by taking microphotographs of cross-sections of the respective multilayer films. The cross-sections were obtained by freezing the respective samples in liquid nitrogen and breaking them (cryo fracture) and the microphotographs were taken using a light microscope (LM), Reichert Jung, Polyvar MET. Settings of equipment: Incident/transmitted light: dark/bright field, Magnification: 50×.

The microphotographs obtained for Examples 1-3 and Comparative Examples 1-3 are shown in FIGS. 5a-5f. The thicknesses of foam layer 12 provided in each case from the rolling bead via the upstream substrate gap 9 and of the skin layer provide from coating chamber 8 via the outlet gap 10 and the downstream substrate gap 9 (Examples 1-3) or the downstream substrate gap 9 (Comparative Examples 1-3), respectively, were taken from the microphotographs and are reproduced in Table 5 below.

TABLE 5

| Micrograph Summary | | | |
| --- | --- | --- | --- |
| Example | Fig. | Thickness of bottom foam layer 12 (μm) | Thickness of top layer 13 (μm) |
| Ex. 1 | 6e | 700 | 25 |
| Ex. 2 | 6f | 690 | 30 |
| Ex. 3 | 6d | 498 | 101 |
| Comparative Ex. 1 | 6a | 471 | 184 |
| Comparative Ex. 2 | 6b | 474 | 203 |
| Comparative Ex. 3 | 6c | 392 | 290 |

The results of Table 5 show that thin top layers can be obtained for the two-layer multilayer films of Examples 1-3 according to the method of the invention. The thickness of the top (skin) layer is essentially independent of the viscosity used as can be seen from a comparison of Examples 1 and 2; in Example 3 a wider outlet gap 10 was used. The top layers obtained in Comparative Examples 1-3 are distinctly larger than those obtained in Examples 1 and 2, and the thickness of the top layers of Comparative examples 1-3 strongly depends on the viscosity of the precursor used.

The microphotograph obtained for Example 4 is shown in FIG. 5g. It can be seen that the method of the present invention allows to produce an essentially symmetric skin-foam-skin tapes wherein the thicknesses of the bottom and top skin layers are very similar. The thickness values taken from FIG. 5g are compiled in Table 6 below.

TABLE 6

Micrograph Summary

| Example | Fig. | Width of bottom skin layer 12 (μm) | Width of middle foam layer 13 (μm) | Width of top (skin) layer 14 (μm) |
|---|---|---|---|---|
| Ex. 4 | 6g | 44 | 495 | 25 |

LIST OF REFERENCE NUMBERS 1, 20, 30, 50, 60 coating apparatus
2, 3, 4 coating knife
5 substrate
6 downstream direction
7, 8 coating chamber
9 substrate gap
10 outlet gap
11 solid film
12, 13, 14 precursor layer
15 bulge
16 roller
100 prior art coating apparatus
I, II, III liquid precursor

What is claimed is:

1. Continuous self-metered process of forming a multilayer film comprising at least two superimposed polymer layers, the method comprising:
   providing a substrate;
   providing two or more coating knives which are offset, independently from each other, from said substrate and/or from an adjacent coating knife to form at least one substrate gap relative to the surface of the substrate and one or more outlet gaps relative to the surface of an adjacent coating knife;
   moving the substrate relative to the coating knives in a downstream direction, providing two or more curable liquid precursors of the polymers to the upstream side of the coating knives thereby coating the two or more precursors through the respective outlet gaps and the at least one substrate gap as superimposed layers onto the substrate; and
   curing the precursor of the multilayer film thus obtained;
   wherein a lower layer of a curable liquid precursor is covered by an adjacent upper layer of a curable liquid precursor or a film, respectively, essentially without exposing said lower layer of a curable liquid precursor, wherein the method further comprises moving at least one of the coating knives relative to each other to adjust the width of the one or more outlet gaps formed between the surfaces of adjacent coating knives to be between 50 μm and 1,500 μm,
   wherein the precursor of the multilayer film comprises at least two precursor layers, and at least one exposed layer is applied via one of the outlet gaps and has a thickness between 30 μm and 200 μm, wherein the thickness of the at least one exposed layer is controlled by adjusting the width of the one of the outlet gaps, whereas a total thickness of the superimposed layers is controlled by adjusting the width of the at least one substrate gap, and
   wherein the liquid precursors of the polymer material are provided in one or more coating chambers essentially abutting each other and being bordered in downstream direction by the respective coating knives.

2. Process according to claim 1, wherein the width of the one or more outlet gaps formed between the surfaces of adjacent coating knives are between 100 μm and 1000 μm.

3. Process according to claim 1, wherein the cross-sectional profile of at least one of the coating knives at its transversely extending bottom edge facing the substrate is essentially planar, curved, concave or convex.

4. Process according to claim 1 wherein the adjacent coating knives exhibit a skewed arrangement relative to each other thereby forming the respective outlet gap between them.

5. Process according to claim 1 wherein at least one of the outlet gaps forms a narrowed outlet of the coating chambers.

6. Process according to claim 1 wherein the top layer of the stack of superimposed precursor layers is formed by an outlet gap and optionally a substrate gap.

7. Process according to claim 1 wherein a solid film is applied through an outlet gap formed between two adjacent coating knives whereby said solid film forms the downstream coating knife of the outlet gap or is applied via the upstream surface of the downstream coating knife of such gap, respectively.

8. Process according to claim 1 wherein the liquid precursors are each applied independently from each other under ambient pressure or an over-pressure, respectively.

9. Process according to claim 1 wherein the precursor layers are cured thermally and/or by exposing them to actinic radiation after they have passed the back wall of a coating apparatus.

10. Process according to claim 9 wherein at least one of the precursors comprises at least one compound having a radiation curable ethylene group.

11. Process according to claim 1 wherein the precursors of the bottom and/or top layers are substantially free of gas cavities in the form of gas inclusions resulting from stirring in gas bubbles for from blowing agents, hollow polymeric or inorganic microspheres or expandable polymeric microspheres comprising an expandable polymer shell enclosing a gaseous atmosphere.

12. Process according to claim 1 wherein the precursors of the multilayer film comprises at least 3 layers wherein at least one intermediate layers comprises a foam material comprising gas cavities in the form of gas inclusions resulting from stirring in gas bubbles or from blowing agents, hollow polymeric or inorganic microspheres or expandable polymeric microspheres comprising an expandable polymer shell enclosing a gaseous atmosphere.

13. Process according to claim 1 wherein the precursor of the multilayer film comprises at least two precursor layers wherein at least one exposed layer is applied via an outlet gap and has a thickness between 50 to 150 μm.

14. Process according to claim 13 wherein the liquid precursor formed into the exposed layer has a Brookfield viscosity of between 1,000-20,000 mPas at 25° C.

15. Process according to claim 1 wherein the precursor of the multilayer film comprises at least three layers wherein at least the top layer is applied via an outlet gap and wherein the top and bottom layer of said film independently from each other comprise each a pressure-sensitive adhesive and exhibit a thickness between 30 to 200 μm for each layer.

16. The process according to claim 1, further comprising providing one or more solid films and applying the one or more solid films essentially simultaneously with the formation of the adjacent lower polymer layer.

17. Process according to claim 16 wherein a release liner is attached to the exposed surface of the top layer of the precursor of the multilayer film essentially simultaneously with the formation of such top layer.

18. Process according to claim 16 wherein the substrate and/or the solid film are selected from a group of materials comprising polymeric films or webs, metal films or webs, woven or non-woven webs, glass fiber reinforced webs, carbon fiber webs, polymer fiber webs or webs comprising endless filaments of glass, polymer, metal, carbon fibers and/or natural fibers.

19. The process according to claim 1, wherein the liquid precursors of the polymer material are provided in the one or more coating chambers essentially abutting each other and being bordered in downstream direction by at least one of a front wall, one or more intermediate walls, and a back wall which are formed by the coating knives.

20. The process according to claim 1, wherein a volume flow rate of the curable liquid precursors is not provided by a fluid metering device upstream, and the volume flow rate is variable with a substrate speed such that there is no inverse proportionality between a coating thickness of a precursor layer and a speed of the substrate.

* * * * *